(12) United States Patent
Harris et al.

(10) Patent No.: US 9,542,221 B2
(45) Date of Patent: Jan. 10, 2017

(54) DYNAMIC CO-SCHEDULING OF HARDWARE CONTEXTS FOR PARALLEL RUNTIME SYSTEMS ON SHARED MACHINES

(71) Applicant: Oracle International Corporation, Redwood City, CA (US)

(72) Inventors: Timothy L. Harris, Cambridge (GB); Virendra J. Marathe, Florence, MA (US); Martin C. Maas, Berkeley, CA (US)

(73) Assignee: Oracle International Corporation, Redwood City, CA (US)

( * ) Notice: Subject to any disclaimer, the term of this patent is extended or adjusted under 35 U.S.C. 154(b) by 37 days.

(21) Appl. No.: 14/285,513

(22) Filed: May 22, 2014

(65) Prior Publication Data
US 2015/0339158 A1 Nov. 26, 2015

(51) Int. Cl.
*G06F 9/28* (2006.01)
*G06F 9/48* (2006.01)
*G06F 9/50* (2006.01)

(52) U.S. Cl.
CPC ............ *G06F 9/4881* (2013.01); *G06F 9/48* (2013.01); *G06F 9/4856* (2013.01); *G06F 9/50* (2013.01);
(Continued)

(58) Field of Classification Search
CPC ................. G06F 7/78; G06F 8/00–8/78; G06F 9/44–9/455; G06F 11/36
See application file for complete search history.

(56) References Cited

U.S. PATENT DOCUMENTS

| 7,137,119 B1* | 11/2006 | Sankaranarayan ... G06F 9/5011 718/103 |
| 2003/0009769 A1* | 1/2003 | Hensgen .................. G06F 9/52 725/131 |

(Continued)

OTHER PUBLICATIONS

Luo et al., The Design and Implementation of Heterogeneous Multicore Systems for Energy-efficient Speculative Thread Execution, 2013.*

(Continued)

*Primary Examiner* — Wei Zhen
*Assistant Examiner* — Zhan Chen
(74) *Attorney, Agent, or Firm* — Robert C. Kowert; Meyertons, Hood, Kivlin, Kowert & Goetzel, P.C.

(57) ABSTRACT

Multi-core computers may implement a resource management layer between the operating system and resource-management-enabled parallel runtime systems. The resource management components and runtime systems may collectively implement dynamic co-scheduling of hardware contexts when executing multiple parallel applications, using a spatial scheduling policy that grants high priority to one application per hardware context and a temporal scheduling policy for re-allocating unused hardware contexts. The runtime systems may receive resources on a varying number of hardware contexts as demands of the applications change over time, and the resource management components may co-ordinate to leave one runnable software thread for each hardware context. Periodic check-in operations may be used to determine (at times convenient to the applications) when hardware contexts should be re-allocated. Over-subscription of worker threads may reduce load imbalances between applications. A co-ordination table may store per-hardware-context information about resource demands and allocations.

20 Claims, 11 Drawing Sheets

(52) U.S. Cl.
CPC ....... *G06F 9/5011* (2013.01); *G06F 2209/486* (2013.01); *G06F 2209/5021* (2013.01)

(56) References Cited

U.S. PATENT DOCUMENTS

| | | | |
|---|---|---|---|
| 2003/0037092 A1* | 2/2003 | McCarthy | G06F 9/5061 718/104 |
| 2004/0107421 A1 | 6/2004 | VoBa et al. | |
| 2005/0141554 A1* | 6/2005 | Hammarlund | G06F 9/5011 370/468 |
| 2006/0064698 A1* | 3/2006 | Miller | G06F 9/5072 718/104 |
| 2006/0130066 A1* | 6/2006 | Bozak | G06F 8/456 718/104 |
| 2007/0043935 A2 | 2/2007 | Kissell | |
| 2007/0074219 A1 | 3/2007 | Ginsberg | |
| 2007/0294666 A1* | 12/2007 | Papakipos | G06F 8/20 717/119 |
| 2009/0037926 A1* | 2/2009 | Dinda | G06F 9/4887 718/107 |
| 2009/0160867 A1 | 6/2009 | Grossman | |
| 2009/0165007 A1 | 6/2009 | Aghajanyan | |

OTHER PUBLICATIONS

Yu et al., Adaptive Multi-Threading for Dynamic Workloads in Embedded Multiprocessors, 2010.*

Malte Schwarzkopf, Andy Konwinski, Michael Abd-El-Malek, and JohnWilkes. Omega: flexible, scalable schedulers for large compute clusters. In EuroSys '13: Proc. 8th European Conference on Computer Systems, pp. 351-364, Apr. 2013.

Thomas Anderson, Brian Bershad, Edward Lazowska, and Henry Levy. Scheduler activations: Effective kernel support for the user-level management of parallelism. ACM Transactions on Computer Systems (TOCS), vol. 10, No. 1, pp. 53-79, Feb. 1992.

Juan A. Colmenares, Gage Eads, Steven Hofmeyr, Sarah Bird, Miquel Moret'o, David Chou, Brian Gluzman, Eric Roman, Davide B. Bartolini, NiteshMor, Krste Asanovi'c, and John D. Kubiatowicz. Tessellation: refactoring the OS around explicit resource containers with continuous adaptation. In DAC '13: Proc. 50th Annual Design Automation Conference, pp. 76:1-76:10, Jun. 2013.

* cited by examiner

DYNAMIC CO-SCHEDULING OF HARDWARE CONTEXTS FOR PARALLEL RUNTIME SYSTEMS ON SHARED MACHINES

BACKGROUND

Field of the Disclosure

This disclosure relates generally to parallel computing, and more particularly to systems and methods for dynamic co-scheduling of hardware contexts for parallel runtime systems on high-utilization shared machines.

Description of the Related Art

Traditionally, parallelism has been exploited in high performance computing (HPC) and multi-threaded servers in which jobs are often run on dedicated machines, or on fixed sets of cores (or hardware contexts) in a shared machine. Traditional HPC jobs have long, stable CPU-bound phases with fixed resource requirements. Traditional servers exploit the ability to process independent requests in parallel. There is often little parallelism within each request. This style of synchronization lets traditional servers run well on current operating systems.

In contrast, many emerging parallel workloads exhibit CPU demands that vary over time. For example, in graph analytic jobs, the degree of parallelism can both vary over time and depend on the structure of the input graph. Other examples include cases in which parallelism is used to accelerate parts of an interactive application (occurring in bursts in response to user input). Current operating systems and runtime systems do not perform well for these types of workloads (e.g., those with variable CPU demands and frequent synchronization between parallel threads). Typical solutions attempt to avoid interference between jobs either by over provisioning machines, or by manually pinning different jobs to different cores/contexts.

Software is increasingly written to run on multi-processor machines (e.g., those with multiple single-core processors and/or those with one or more multi-core processors). In order to make good use of the underlying hardware, customers want to run multiple workloads on the same machine at the same time, rather than dedicating a single machine to a respective single workload.

SUMMARY

In various embodiments, the systems described herein may implement dynamic co-scheduling of hardware contexts when executing multiple parallel applications. For example, a multi-core computer may implement a resource management layer between the operating system and one or more parallel runtime systems that have been modified to work with components of the resource management layer. The resource management components and resource-management-enabled parallel runtime systems may be configured to work together to use the hardware contexts of the machine efficiently, while reducing load imbalances between multiple parallel applications and avoiding the preempting of threads at inconvenient times.

In some embodiments, runtime systems performing work on behalf of different applications may receive resources on a varying number of hardware contexts as demands of the applications change over time. In some embodiments, the resource management components may co-ordinate to leave exactly one runnable software thread for each hardware context. In some embodiments, the systems described herein may allocate and/or re-allocate hardware threads to various jobs (or worker threads thereof) according to a spatial scheduling policy that grants high priority to one application per hardware context and a temporal scheduling policy that specifies how and when unused hardware contexts should be re-allocated. For example, decisions about whether and/or when to re-allocate hardware contexts may be dependent on whether a job has been granted high priority on a given hardware context or on whether a job that has been granted high priority on a given hardware context has run out of work.

In some embodiments, periodic check-in operations may be performed by the runtime systems (e.g., between tasks or between batches of work items) and may be used to determine (at times convenient to the applications) whether and when various hardware contexts should be re-allocated. The systems described herein may over-subscribe worker threads (e.g., associating a worker thread for each application with each of the hardware contexts in the computer), which, in combination with the dynamic scheduling policies described herein, may reduce load imbalances between the applications. A co-ordination table maintained by the resource management components may store per-hardware-context information about resource demands and allocations. This information may be accessible to the applications and/or the runtime systems, and may be used in determining when and how hardware contexts should be-reallocated.

In some embodiments, applications that are written for and/or compiled over an unmodified parallel runtime system may be run on a resource-management-enabled version of the parallel runtime systems without modification. A common API for synchronization operations that is based on latches and synchronization variables may be used by parallel applications, by resource-management-enabled parallel runtime systems, and by the resource management components, and may provide a single place at which to determining spin/wait decisions for waiting threads and common methods for making those decisions consistently.

Figure 1:
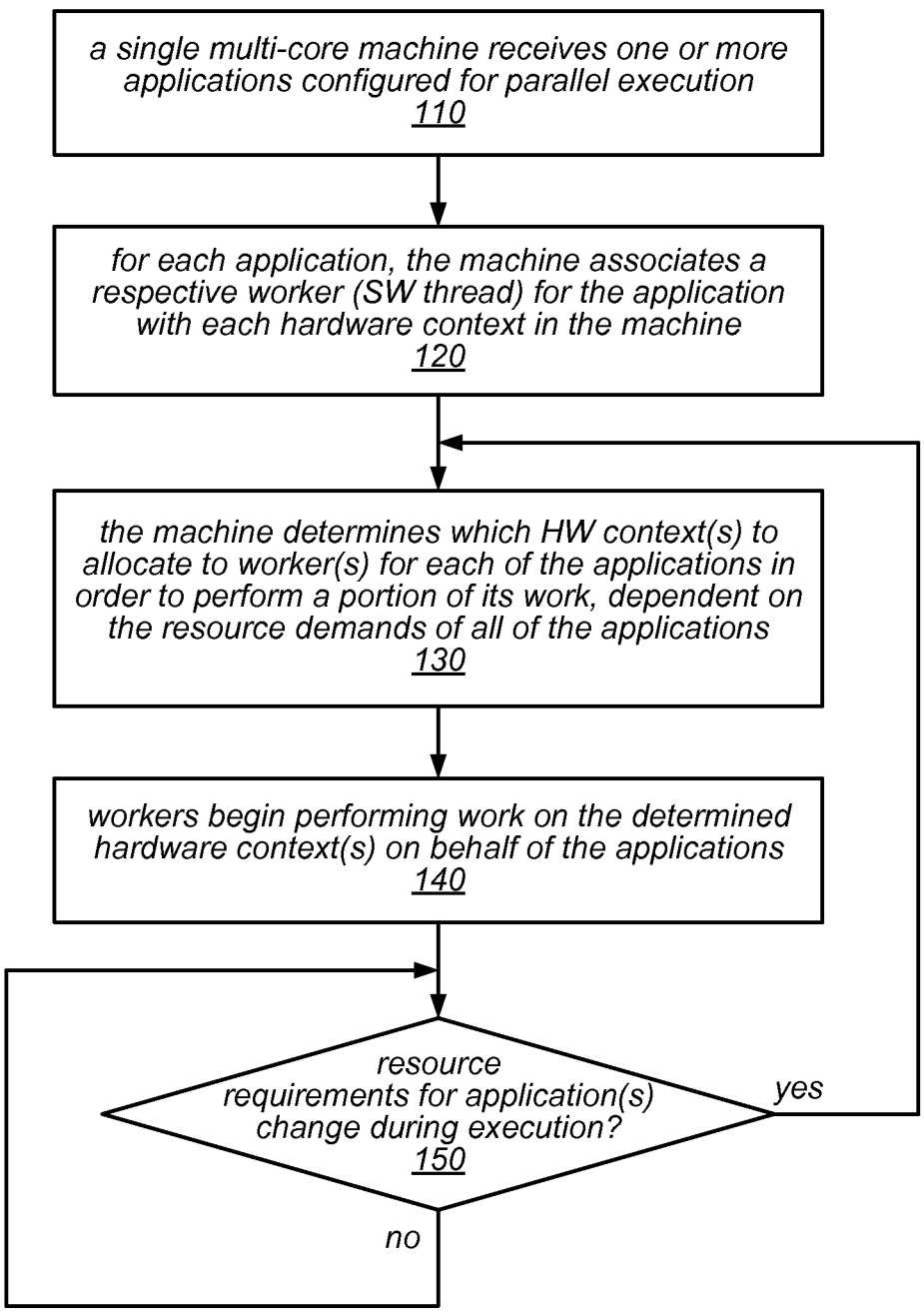
FIG. 1 is a flow diagram illustrating one embodiment of a method for dynamically scheduling parallel applications for execution by parallel runtime systems on a single machine.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, software is increasingly written to run on multi-processor machines. In addition, many parallel workloads, such as those used in graph analytics, are increasingly variable in their CPU requirements. Trends in this area include the need to make effective use of multi-core hardware (leading to increasing use of parallelism within software), the desire to use hardware efficiently (leading to greater co-location of workloads on the same machine), and the expectation that parallel applications should "just work" without needing to perform careful tuning that is directed to any specific hardware. These trends make it important for systems to be able to handle running multiple parallel workloads on the same machine (and for the workloads to behave and perform well when doing so) without programmers needing to tune their applications specifically for a given machine or for the workload or combination of workloads that is running.

Current operating systems and runtime systems do not perform well for these types of workloads (i.e., those with variable CPU demands and frequent synchronization between parallel threads). The performance of applications in these systems is often poor, as programs do not adapt well to a dynamically varying numbers of cores (or hardware contexts), and the CPU time received by different concurrent jobs can differ drastically. More specifically, existing parallel runtime systems interact poorly with the schedulers used by operating systems and virtual machine monitors, often resulting in one (or more) of several common problems. First, preemption can occur at inconvenient times. A classic example can arise while one thread is holding a lock and other threads needing the lock cannot proceed until the lock holder runs. Another example is a parallel loop in which threads claim batches of iterations, but the loop cannot terminate if a thread is preempted mid-batch. Another type of problem is that when a thread waits, it must decide whether to spin or to block. However, the best decision may depend on information that is not usually available to it (e.g., which other threads are running). In addition, there can be a tension between the performance of an individual process and system-level goals (such as using cores/contexts productively, rather than for spinning). Finally, when multiple jobs run together, the CPU time that they actually receive can be drastically different and hard to control. This can depend, for example, on whether or not the operating system prioritizes threads that have recently unblocked. Note that for different processor architectures, different terminology may be used to describe the hardware execution resources. For example, they may be referred to as "hardware contexts," "hardware strands", "hardware threads", "processor cores", or simply "cores". These terms may be used somewhat interchangeably in the descriptions that follow, such that techniques described herein as being applicable in systems in which the hardware execution resources are referred to using one of these terms may also be applicable in systems in which the hardware execution resources are referred to using another one of these terms, or using another term that describes the hardware execution resources of a machine that is capable of executing parallel workloads. Note also that the techniques described herein may be applied at different granularities, e.g., for scheduling complete processors, for scheduling cores within those processors (each of which may include comprising multiple hardware contexts), or for scheduling individual hardware contexts.

In order to make good use of the hardware, customers want to run multiple workloads on the same multi-core machine at the same time, rather than dedicating a single machine to a single workload. Typical approaches that are applied by existing systems include attempting to avoid interference between jobs by over provisioning machines, or by manually pinning each of the jobs to different cores. From one viewpoint, both approaches can waste resources by leaving resources allocated to one job idle if that job is not able to make use of them. From another viewpoint, these approaches can limit the performance of jobs by denying a job the ability to use resources that would otherwise be idle in the machine.

In some existing systems, if a user runs a set of parallel workloads on a system, they typically have to manually set the number of software threads that the workload will use, which can creates a number of risks that can lead to poor performance. For example, if too few software threads are requested, a job could lose out on performance that the hardware could provide. If too many software threads are requested, the jobs will interfere with each other. In this case, the system has to decide how to allocate the hardware threads (contexts) to the software threads in the different jobs. This, in turn, can lead to problems due to oversubscription, in which the total number of threads is higher than the number of hardware contexts that are available to run them. As parallelism is becoming more ubiquitous, there is less programmer effort put into tuning software to run on a particular parallel machine, since there are more different types of machines capable of executing parallel workloads, and the differences between them make it difficult (if not impossible) to tune applications for each one.

In some embodiments, the systems and techniques described herein may avoid the programmer having to explicitly set the number of threads to use to execute their workload. They may also allow workloads to use all of the resources of the machine when they are idle, but to scale back the resources they use when multiple jobs are running so that the jobs do not interfere with each other to the extent that they do in current parallel runtime systems.

One of the types of interference problems that may be mitigated through the use of the resource management and dynamic scheduling techniques described herein is that if the user over-subscribes threads (e.g., if an application runs more software threads than the number of hardware contexts available), the operating system has to move resources around between the different jobs and it may do so at a time that is inconvenient for the software. For example, it may be inconvenient for the operating system to preempt a thread while it holds a lock, since other threads that need that lock can only make progress once the lock holder has been resumed and has released the lock. In another example, if a system has split a piece of work to run across a fixed number of software threads and one of those threads gets preempted, that thread may become what is known as a "straggler". In this example, the straggler may hold up all of the other threads because its share of the work is not finished as promptly as the other shares of work performed by other threads are. In various embodiments, the resource management and dynamic scheduling techniques described herein may also mitigate this effect (e.g., it may avoid threads becoming stragglers).

In some existing systems, a comparison made between the performance of pairs of jobs running on a two-socket machine and their performance running alone on one socket has illustrated that, on the shared two-socket machine, rather than each job performing no worse than it did in isolation on the one-socket machine, some jobs take up to 3.5× longer. Much, if not most, of this interference is due to poor interaction between the runtime systems and the operating system. By contrast, when using the resource management and dynamic scheduling techniques described herein, the worst combinations may be reduced to 1.25× the execution time when running in isolation on separate one-socket machines.

In a traditional system, a runtime system would be written with an explicit number of threads and the operating system would be responsible for multiplexing them over the hardware contexts in the machine. In some embodiments, the systems described herein change the way that CPU resources are given to an application and rely on the runtime system to receive explicit up-calls from a resource management component built over the operating system (e.g., in a layer between the operating system and one or more resource-management-enabled parallel runtime systems) each time it is given resources on one of the hardware contexts. These systems may also be configured to vary, over time, the number of these hardware contexts that each of the applications is running over. For example, while just one application is executing, the runtime may receive up-calls from the resource management component on behalf of the applicant on all of the hardware contexts of the machine, but if more than one application is executing, they may each be pegged back (such that the runtime system receives up-calls on a subset of the hardware contexts of the machine for each application). In some embodiments, when receiving these up-calls, the runtime system may perform a piece of work on behalf of the application and then decide whether it should continue running using that hardware context or should yield the hardware context because another higher-priority job has started (according to various priority and scheduling policies).

In some embodiments, the techniques described herein may make parallel runtime systems more malleable in the sense that they can receive resources on a dynamically varying number of hardware contexts rather than on a fixed number of threads that it has created. In such embodiments, if a resource is available on the machine, the runtime system may expand and receive up-calls on multiple hardware contexts (i.e., the runtime system may be able to spread work more thinly across those contexts). If the runtime system receives fewer resource, it may spread the work such that each of the limited resources it gets has to do more work.

In the systems described herein, a resource management layer is introduced for parallel runtime systems. In some embodiments, the systems and techniques described herein provide a means for running multiple such parallel workloads together on a single machine that reduces the interference between the workloads, while still allowing the machine to run with high resource utilization. More specifically, the systems described herein may implement one or more of the following techniques, all of which are described in more detail below:
  Resource allocation between multi-threaded processes, while avoiding preemption at inopportune times
  A common latch/SVar synchronization API
  Over-subscription of the number of threads created for unmodified jobs (e.g., jobs compiled for an unmodified OpenMP runtime system) in order to reduce load imbalances between the jobs.

In some existing systems, abstractions for control over preemption identify short sections during which preemption should be disabled. In some embodiments, the systems described herein may turn this around and instead identify "check in" points at which preemption is reasonable. Unlike traditional co-operative multitasking, a timer may be retained as a fallback in case a thread fails to check in.

In some embodiments, a SyncWaitUntilTrue API used with latches and synchronization variables (SVars) may allow a thread that is updating a shared variable to know precisely which other thread(s) its update will wake up, without the waker needing to know the details of the condition being waited for. This hand-off approach may avoid multiple waiters being woken when only one of them will be able to make progress. In existing systems, this kind of "stampede" can happen both with mutex/condition variable synchronization, and with synchronization using transactional memory "retry" operations.

One existing parallel runtime system that may be modified to use the resource management and dynamic scheduling techniques described herein is the OpenMP (Open Multi-Processing) programming model (which encompasses runtime system components and associated programming language abstractions). OpenMP is a conventional runtime system for parallel programming in which the primary way that the program expresses work that can be split over multiple hardware contexts is by using a parallel for loop, and in which batches of these loop iterations can be executed in parallel on the different hardware contexts. For example, if a loop has 1000 iterations and there are 10 hardware contexts, the work may be split evenly across the hardware contexts, and each hardware context may be responsible for performing 100 of the loop iterations.

Traditionally, tuning OpenMP jobs may be assumed to be done by the programmer, and the language specification makes it difficult for a runtime system to adapt the number of threads in use without violating the specification. In existing OpenMP runtime systems, it is generally considered to be a bad thing to over-subscribe the system (i.e., to use more OpenMP threads than there are hardware contexts in the processors). However, in some embodiments, of the systems described herein, it has been observed that combining over-subscription with a lightweight cooperative mechanism for switching between threads may avoid the main synchronization costs of oversubscription, while reducing the load imbalances between jobs when running on a dynamically variable number of hardware contexts. In such embodiments, the more OpenMP threads there are, the easier they may be to share evenly between hardware contexts. The results of experiments performed on prototype systems indicate that this approach may reduce the likelihood of interference, reduce the severity of any interference, and/or increase the ability for jobs to benefit from otherwise-idle time in the execution of other jobs.

One embodiment of a method for dynamically scheduling parallel applications for execution by parallel runtime systems on a single machine is illustrated by the flow diagram in FIG. 1. As illustrated at 110, in this example, the method may include a single multi-core machine receiving one or more applications configured for parallel execution. For example, the runtime system may be a resource-management-enabled parallel runtime system executing over an operating system on a multi-core machine, and it may receive an initial application to be executed or a collection of applications to be executed. The method may include, for each application, the machine (or the runtime system or a resource management component executing thereon) associating a respective worker (e.g., a software thread) for the application with each hardware context in the machine, as in 120.

As illustrated in this example, the method may include the machine (or the runtime system or resource management component executing thereon) determining which hardware context or hardware contexts to allocate to various workers for each of the applications in order to perform a portion of its work, dependent on the resource demands of all of the applications, as in 130. For example, during an initial allocation (when the application or collection of applications is received), the method may include allocating a hardware context to each of two or more workers for each application to perform an initial batch of operations (e.g., some number of loop iterations) for each application. The method may also include the workers beginning to perform work on the determined hardware context(s) on behalf of the applications, as in 140. For example, in some embodiments, each of the workers may make an up-call to an activate function of the resource-management-enabled parallel runtime system in order to claim their respective hardware contexts and being performing work.

If the resource requirements for one or more of the applications change during execution (shown as the positive exit from 150), the method may include repeating at least some of the operations illustrated in FIG. 1 (e.g., beginning at element 130), in order to re-allocate some or all of the hardware contexts as necessary (e.g., according to various applicable policies) and continuing execution of one or more applications. For example, such a re-allocation may be performed in response to the starting and/or completing of various items of work or batches of work items, in response to an executing application (job) reaching completion and/or in response to the submission of an additional application (job). Note that, as described in more detail below, some of the conditions that can trigger such a re-allocation may be detected during execution of a check-in operation. In the example illustrated in FIG. 1, when and if a re-allocation is performed, the machine may allocate one or more of the hardware contexts to perform another batch of work items for the same application on whose behalf the hardware contexts were previously allocated, and/or may allocate one or more of the hardware contexts to different applications than the ones on whose behalf the hardware contexts were previously allocated (assuming they have runnable work). While resource requirements for a set of concurrently executing applications do not change during execution, the method may include the machine continuing to perform work using the current hardware context allocations. This is illustrated in FIG. 1 by the feedback from the negative exit of 150 to its input.

As previously noted, some issues related to scheduling parallel jobs may be exacerbated by the fact that parallel jobs increasingly have burstier CPU demands than traditional workloads. For example, some graph analytics jobs may have CPU demands that vary over 10-100 ms timescales. This variability may provide an impetus to combine jobs, exploiting idle time in one job to make progress in another job.

In various embodiments, the systems described herein may employ any or all of the following techniques to improve performance:

Multiple parallel jobs may co-ordinate their resource demands to leave exactly one runnable software thread for each hardware context. This approach may, in general, avoid the operating system preempting threads transparently.

CPU time may be provided to runtime systems using an up-call mechanism, inspired by scheduler activations. In some embodiments, with this approach, a runtime system may divide its work into small pieces that generally run to completion within each of these up-calls, and that can be multiplexed over however many hardware contexts the runtime system receives.

A single API may be provided for building the synchronization primitives exposed to applications (e.g., locks and barriers), for the synchronization within a runtime system (e.g., managing task pools), and for synchronization within the resource management components themselves. In some embodiments, by combining these three kinds of synchronization, information about which runtime system work is able to execute (e.g., is runnable) may be exposed to the resource management components, and a single point may be provided at which to make spin/block decisions.

Figure 2:
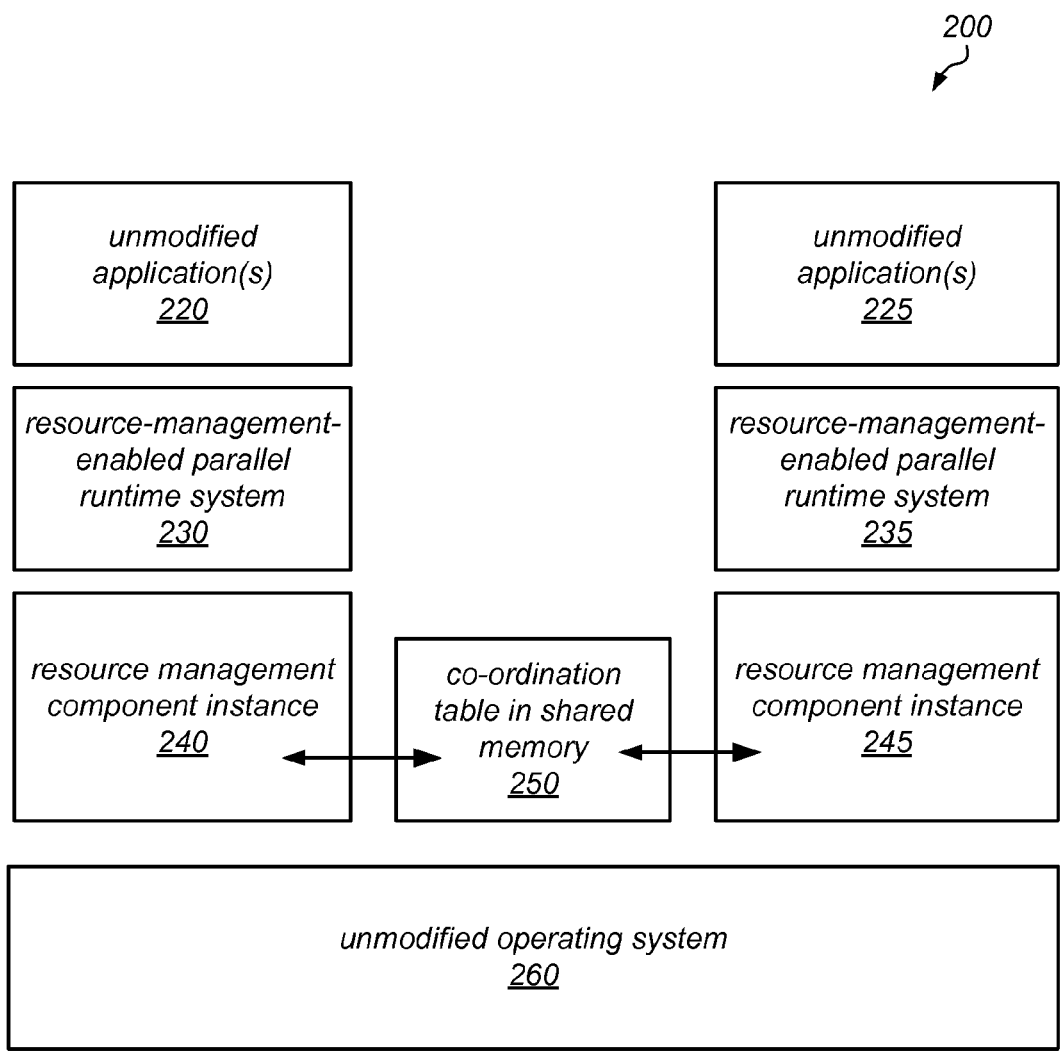
FIG. 2 is a block diagram illustrating one embodiment of a system that implements resource management components and resource-management-enabled parallel runtime systems, such as those described herein.

One embodiment of a system that implements resource management components and resource-management-enabled parallel runtime systems, such as those described herein, is illustrated by the block diagram in FIG. 2. More specifically, FIG. 2 illustrates the overall structure of an example implementation of such a system. In this example, each of the resource management component instances operates as a user-mode shared library that links with resource-management-enabled versions of different parallel runtime systems to implement dynamic co-scheduling of hardware contexts for parallel runtime systems, as described herein. In this example, multiple instances of the library interact through shared memory to cooperatively control the use of the hardware contexts of the machine on which the system is implemented. As previously noted, the runtime systems may be adapted for use with the resource management component instances. However, applications built over these runtime systems (i.e., applications built for executing over the runtime systems prior to their modification for use with the resource management component instances) may operate without modification, and there may be no need to make changes to the underlying operation system in order to support the resource management components and resource-management-enabled parallel runtime systems.

In the example illustrated in FIG. 2, a system 200 includes one or more unmodified applications 220 that are running over resource-management-enabled parallel runtime system 230, and one or more unmodified applications 225 that are running over resource-management-enabled parallel runtime system 235. Note that, in different embodiments, resource-management-enabled parallel runtime systems 230 and 235 may be parallel runtime systems of the same type or different types. For example, in one embodiment, runtime system 230 may be a resource-management-enabled version of an OpenMP runtime system, while runtime system 235 may be a resource-management-enabled version of a task-pool-based runtime system. In other embodiments, both runtime system 230 and runtime system 235 may be resource-management-enabled versions of an OpenMP runtime system, or both runtime system 230 and runtime system 235 may be resource-management-enabled versions of task-pool-based runtime system.

In this example, each resource-management-enabled parallel runtime system links to resource management library functions in a respective resource management component instance. For example, resource-management-enabled parallel runtime system 230 makes calls into resource management component instance 240, and resource-management-enabled parallel runtime system 235 makes calls into resource management component instance 245. Both resource management component instance 240 and resource management component instance 245 operate over an unmodified operating system 260 (which may be one of any of a variety of operating systems). As described in more detail herein, and resource management component instance 240 and resource management component instance 245 coordinate resource allocation (e.g., the allocation of hardware contexts to various jobs and/or work items thereof) through a co-ordination table in shared memory 250.

Typically, with OpenMP (and with other parallel runtime systems that can be modified to use the resource management techniques described herein), applications compiled for the unmodified runtime system may expose a large amount of work that is able to run in parallel. While it may be possible for an application (e.g., an OpenMP application) to request explicit numbers of threads, this usage is not typical. Instead, the number of threads may typically be set by the user when they start the application. In some embodiments, rather than relying on the user to set the number of threads, a resource-management-enabled OpenMP runtime system may use an interface (such as one described in more detail below) to express its own work to one of the resource management components described herein. In some embodiments, the management of the co-ordination table may be entirely the responsibility of these resource management components.

As previously noted, in some embodiments (including in prototypes built to demonstrate the techniques described herein) these resource management components may be implemented as shared libraries running in user mode as part of these applications. However, in other embodiments, they may be implemented as part of the operating system kernel, with the benefit that this approach protects the shared data structure from corruption by the application or by a bug in one of the runtime systems, at a cost of extra transitions between user mode and kernel mode and extra engineering effort to build them in the kernel.

Figure 3:
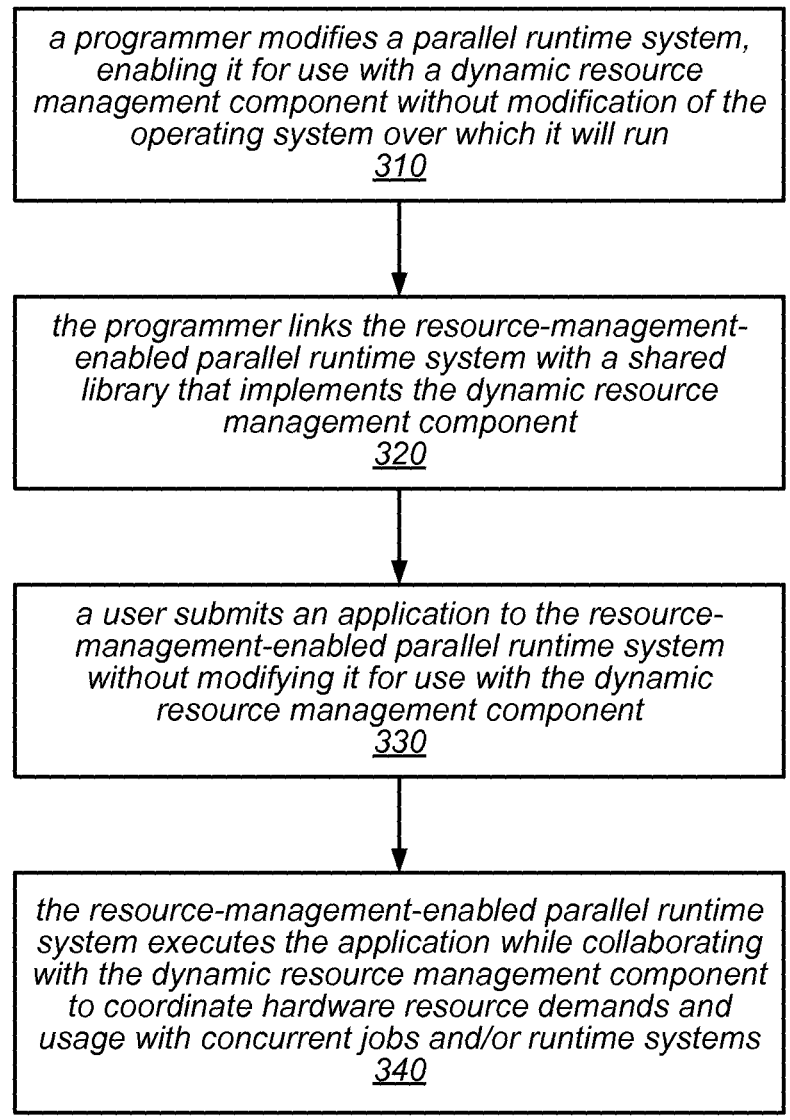
FIG. 3 is a flow diagram illustrating one embodiment of a method for configuring and using a system that implements resource management components and resource-management-enabled parallel runtime systems, such as those described herein.

One embodiment of a method for configuring and using a system that implements resource management components and resource-management-enabled parallel runtime systems, such as those described herein, is illustrated by the flow diagram in FIG. 3. As illustrated at 310, in this example, the method may include a programmer modifying a parallel runtime system, enabling it for use with a dynamic resource management component (according to the APIs described herein) without modification of the operating system over which it will run. The method may also include the programmer linking the resource-management-enabled parallel runtime system with a shared library that implements the dynamic resource management component, as in 320.

Once the system has been configured for dynamic co-scheduling of hardware contexts, the method may include a user submitting an application to the resource-management-enabled parallel runtime system without modifying it for use with the dynamic resource management component, as in 330. For example, the application may be written to conform to various APIs of the parallel runtime system that do not change following its modification for use with the dynamic resource management component. The method may also include the resource-management-enabled parallel runtime system executing the application while collaborating with the dynamic resource management component to coordinate hardware resource demands and usage with other concurrently executing jobs and/or runtime systems, as in 340. Note in other embodiments, a programmer may create a (new or unique) parallel runtime system that is configured for use with a dynamic resource management component (according to the APIs described herein) rather than modifying an existing parallel runtime system for use with a dynamic resource management component. In this case, the application submitted for execution may be written to an API for the new or unique runtime system but may not need to know anything about the underlying resource management component or its dynamic resource allocation and scheduling policies.

In some embodiments, the techniques described herein may be implemented such that they focus on improving co-scheduling between jobs in settings in which workloads identify sources of parallelism without explicitly forking threads. The number of hardware contexts used may be set either by tuning parameters, or by the runtime system, in different embodiments. In some embodiments, it may be assumed that parallel sections of jobs are generally CPU-bound and so each software thread is generally able to completely use a single hardware context. Some existing parallel runtime systems use lightweight threads to issue IO operations concurrently. Since these systems fit these assumptions, multiplexing their threads over a single software thread, and combining IO operations into a slower rate of batches, the techniques described herein may be applied to these systems to improve performance and/or resource utilization, in some embodiments.

In some embodiments, a goal of the resource management and dynamic scheduling techniques described herein is to match the demand from different applications to the hardware resources that are available (e.g., so that the system is left with exactly one runnable software thread for each of the hardware contexts in the machine). In other words, these techniques may allow the runtime system to make efficient use of the available resources by mapping the available hardware contexts to the demands of each of the jobs that are submitted. For example, if a machine has 64 hardware contexts, and is only running one job, that job may use all 64 hardware contexts (if there is enough work for all of them). If the machine is running two jobs (e.g., if another job starts), the system may be configured to cut back the number hardware contexts that are allocated to the first job so that each of the two jobs runs on 32 contexts each, and so on. As more jobs start, the number of hardware contexts allocated to each one may be cut back even more (e.g., if the system policy indicates that resources should be shared equally), or the number of hardware contexts allocated to particular ones of the jobs may be cut back according to another type of resource allocation sharing policy. Note that in some embodiments, each job may be a separate and distinct application running on behalf of a particular user (e.g., different users), and these application may not necessarily be related. In other embodiments, the same approaches may be applied in a system in which jobs (or work items thereof) are scheduled for execution on virtual machines rather than applications running within a single operating system.

In some embodiments, the different applications coordinate to decide which ones use which of the hardware contexts in the machine. For example, in some embodiments, each of the applications publishes its resource demands (e.g., requests for CPU hardware contexts) or provides its resource demands to a resource management component that writes them into a co-ordination table in memory that is shared between all the applications. In other words the resource demands of all executing application are maintained in that table and each of the applications can observe the resource demands from the other applications. As previously noted, there may be different policies applied within the resource management components specifying how the hardware contexts are to be shared between the applications. One such policy is an equal share policy, in which each application is provided with an equal share of the resources (i.e., hardware contexts are shared in equal portions between the applications that are able to use them, which may or may not include all of them at any given time).

In some embodiments (including in the prototype implementations described herein) each of the applications in the resource management layer may create a software thread for each of the hardware contexts in the machine. Then, using a condition variable within the shared data structure, all but one of the applications (one that is granted high priority for the given hardware context) may block their respective software threads on a given hardware context. For example, if the machine has 64 hardware contexts and there are two applications to be executed. For each of the two applications there may be 64 software threads (workers), and one of those 64 software threads may be pinned to each of the hardware contexts in turn. This may be thought of in terms of a matrix that includes one row for each application and one column for each hardware context. In this example, there would be 128 software threads (workers), and the resource management components may be configured to ensure that in each of the columns in that matrix, all but one of the software threads is blocked on the shared condition variable at any time. In this example, the resource management components may control the allocation and preemption of resources within a check-in function that is used by each thread to either wake another thread within a different application (if the first thread is wanting to yield the hardware context) or to sleep on the condition variable (once it has yielded), in order to wait to be woken again when the hardware context is allocated back to it. In other embodiments, the resource management components may control the allocation and preemption of resources using other techniques (e.g., within in the operating system kernel).

As previously noted, one of the techniques that may be employed in the systems described herein is dynamic spatial scheduling. As noted above, the resource management components described herein may aim for concurrent runtime systems to leave exactly one runnable software thread pinned to each hardware context in the machine. In some embodiments, the runtime systems may claim hardware contexts via a co-ordination table in shared memory, adjusting their own use of hardware contexts when other jobs start or finish, and/or when the amount of parallel work they have available changes. In various embodiments, it may be assumed that the runtime systems cooperate with each other. In some embodiments, the hardware contexts of a multi-core machine may be dynamically partitioned between jobs. For example, each job may be given a fixed portion of the CPUs when all of the jobs are runnable, but the system may allow jobs to make use of otherwise-idle resources when they are available. In some embodiments, dynamic spatial scheduling may be controlled by two policies: a spatial allocation policy and a temporal allocation policy.

In some embodiments, a spatial scheduling policy may define which jobs should use which hardware contexts when all the jobs are runnable. The spatial scheduling policy may grants a single job high priority for each hardware context. This policy may defines a state for the system when jobs remain CPU-bound, and may allow the exploration of different placement policies such as whether to allocate all of the hardware contexts in a given core to the same job. In some embodiments, spatial scheduling may be repeated when jobs start or terminate. In other words, the spatial scheduling policy may be used to vary what could be thought of as the baseline allocation to the applications (giving to each an equal share of the hardware contexts) as new applications start and existing applications finish.

As previously noted, in some embodiments, allocations may vary over time according to the changing requirements of the jobs that are executing. For example, one application may have a phase in which it can use a large number of hardware contexts, but it may also have a phase in which it is running serial code and can only use a single context. In this example, when the application is in a serial phase, it may be publishing its resource requirements in the table, but it may not be able to use any additional hardware contexts. In this case, the extraneous hardware contexts (those used in the parallel phase that are not needed in the serial phase) may again be shared (e.g., equally) between any remaining applications that are able to make use of them.

In some embodiments, a temporal scheduling policy may define how to use a hardware context when its high priority job is idle. Note that there may be a trade-off to be made between re-allocating spare resources and letting the high priority jobs keep their hardware contexts in the hope that they will have new work soon (or simply to avoid disruption to the state of local caches resulting from a re-allocation exercise).

In some embodiments, the approach to dynamic spatial scheduling in the system may be described as follows:

Each job may have a dedicated hardware context for its "main" thread. For example, in OpenMP, this thread may be responsible for spawning parallel work and the performance of the job is highly dependent on the main thread's performance.

If a job runs out of work, it may retain hardware contexts on which it has high priority for a configurable hysteresis delay $H_{high}$, which may have a default value or may be configurable by the user. This rule may allow the job to retain resources even if it has short sequential sections in between parallel work.

After this delay, the retained hardware contexts may be re-allocated to other jobs. If these, in turn, run out of work then they may retain the re-allocated hardware context for a delay $H_{low}$, which may have a default value or may be configurable by the user, and which may or may not have the same value as $H_{high}$ (assuming that the job with high priority is still out of work, and there are no other low priority jobs with work). After a delay of $H_{low}$ without obtaining more work, a re-allocated hardware context may be returned to its high priority job. The rule may avoid low priority jobs losing hardware contexts during short sequential sections, while returning the allocation to a "clean" state if all jobs have no work.

If a job is running on a hardware context on which it does not have high priority, then it must periodically check if the context's high priority job has become runnable, and may yield the hardware context if requested to do so. The check-in period in this case is $P_{low}$, which may have a default value or may be configurable by the user. This rule may allow a job to regain access to its high priority hardware contexts.

If a job has high priority on a hardware context then it must still periodically check for changes to the spatial allocation of contexts. The check-in period in this case is $P_{high}$, which may have a default value or may be configurable by the user, and which may or may not have the same value as $P_{low}$.

One embodiment of a method for implementing dynamic spatial scheduling of hardware contexts, as described above, is illustrated by the flow diagram in FIG. 4. As illustrated at 410, in this example, the method may include a job beginning execution on one or more hardware contexts, one of which is dedicated to the job. For example, for each hardware context, a spatial scheduling policy may grant a single job high priority, and a hardware context on which the job has high priority may be dedicated for its main thread. In some embodiments, the spatial scheduling policy may divide the hardware contexts on which different jobs are granted high priority equally among concurrently executing jobs, while in other embodiments, they may be divided among concurrently executing job according to a different priority policy.

Figure 4:
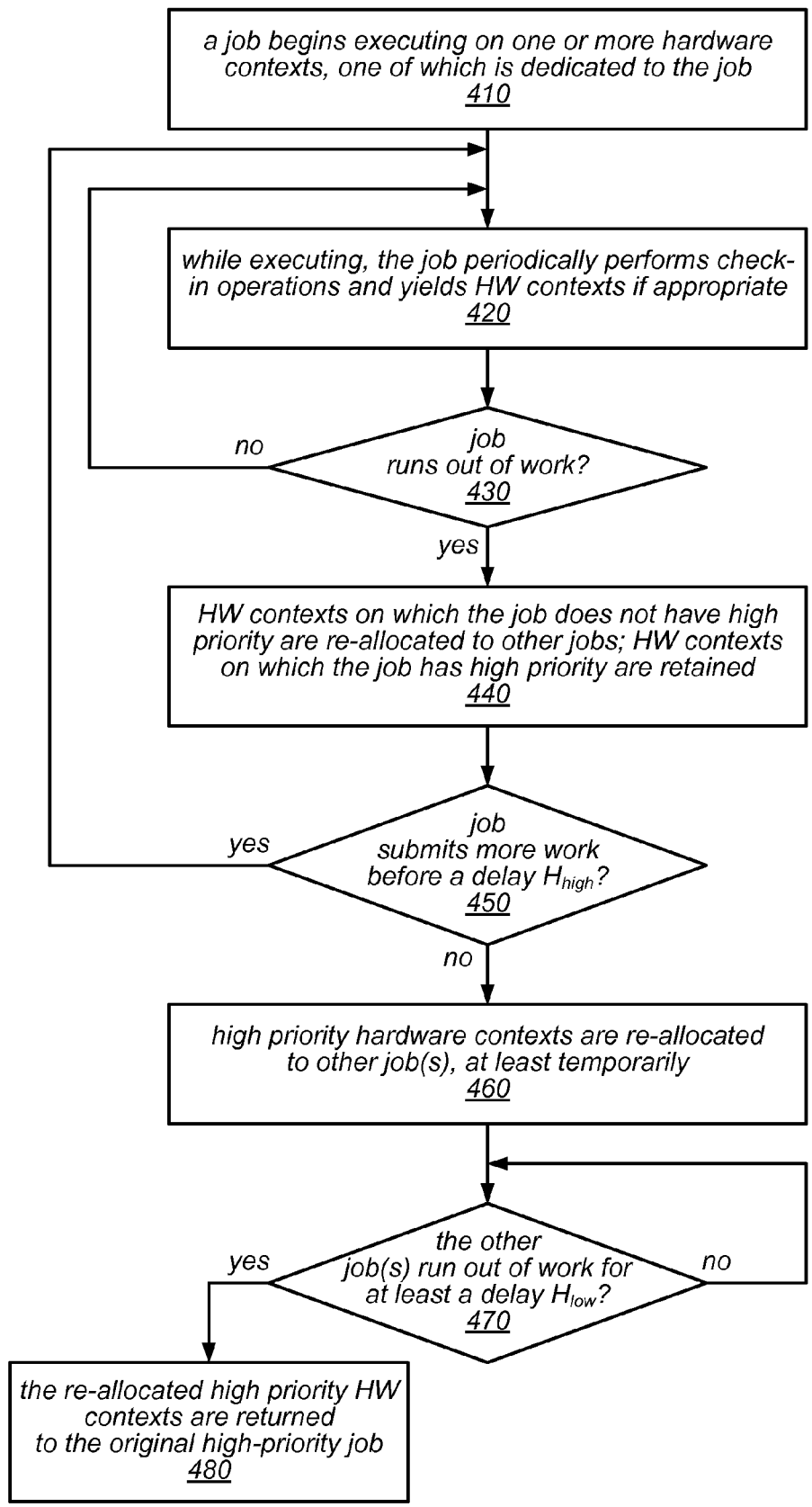
FIG. 4 is a flow diagram illustrating one embodiment of a method for implementing dynamic spatial scheduling of hardware contexts.

As illustrated in this example, the method may include, while executing, the job periodically performing check-in operations and yielding one or more of its allocated hardware contexts if appropriate, as in 420. For example, as described in more detail later, the job may periodically check whether a higher priority thread is runnable on a given hardware context, and/or may check for changes made to the spatial allocation (e.g., in response to changes in the workload of the job or any concurrently executing jobs). While the job still has work, the method may include the job continuing to execute and periodically performing check-in operations, yielding hardware contexts if and when appropriate. This is illustrated in FIG. 4 by the feedback from the negative exit of 430 to 420. However, if the job runs out of work (shown as the positive exit from 430), the method may include re-allocating to other jobs any hardware contexts on which the job does not have high priority, while retaining the hardware context(s) on which the job has high priority, as in 440.

If the job submits more work before a delay period $H_{high}$ has passed (shown as the positive exit from 450), the method may include the job continuing to execute on the retained hardware contexts and periodically performing check-in operations, yielding one or more hardware contexts if appropriate. This is illustrated in FIG. 4 by the feedback from the negative exit of 450 to 420. However, if the job does not submit any more work before a delay period $H_{high}$ has passed (shown as the negative exit from 450), the method may include re-allocating the hardware contexts on which the job has high priority to one or more other jobs (or releasing them for re-allocation to other jobs), at least temporarily, as in 460.

If these other jobs subsequently run out of work for at least a delay period $H_{low}$ (shown as the positive exit of 470), the method may include returning the hardware contexts on which the original job has high priority (and that were re-allocated at element 460) to the original high-priority job (assuming the high-priority job is still running), as in 480. Otherwise, while the other job(s) continue to have work to do (or while any gaps in their workloads are less than a delay period $H_{low}$) the method may include the other job(s) retaining the hardware contexts on which the original job has high priority (and that were re-allocated at element 460), pending expiration of the delay period or another change to the workloads of various concurrent jobs.

The approach described above may, in various embodiments, provide two benefits over statically partitioning a machine or gang-scheduling jobs in time slices. First, resource utilization may be improved if the peaks in the resource demands of one job coincide with the troughs in the resource demands of another job. In addition, since jobs may receive less benefit from each additional hardware context, it may be more beneficial to split hardware contexts among jobs if this can be done without generating interference.

Figure 5A:
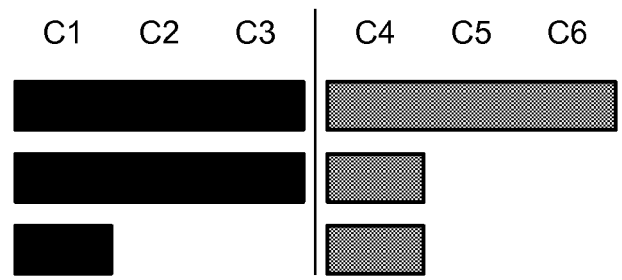
FIGS. 5A-5C illustrate the effects of different policies on the allocation of six processor cores (or hardware contexts thereof) to two jobs, according to at least some embodiments.
Figure 5B:
Figure 5C:
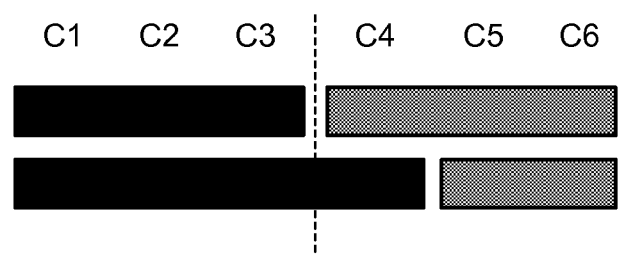

FIGS. 5A-5C illustrate the effects of different policies on the allocation of six processor cores (or hardware contexts thereof) to two jobs, according to at least some embodiments. In these figures, the first one of the jobs is represented by the solid bars in the figures, while the second job is represented by the stippled bars. Note that in these figures, time quanta run from top to bottom. FIG. 5A illustrates the application of a static spatial allocation policy in which the processor cores are statically partitioned between the two jobs for the duration of their executions. In this example, cores C1, C2, and C3 are allocated to the first job, and cores C4. C5, and C6 are allocated to the second job. During a first time period, the first job executes on all three of its allocated cores (C1, C2, and C3) and the second job executes on all three of its allocated cores (C4, C5, and C6). During a second time period, the second job executes on only one of its allocated cores (C4), and the first job again executes on all three of its allocated cores (C1, C2, and C3). In this example, the first job still has more work to do. However, the static partitioning approach prevents the first job from using either of the idle cores (C5 and C6) during the second time period. In this example, during a third time period, the first job executes on only one of its allocated cores (C1), and the second job executes on only one of its allocated cores (C4).

FIG. 5B illustrates the application of a gang-scheduled allocation policy in which the two jobs take turns using as many cores as they can (based on the availability of runnable threads) during alternate time slices. In this example, in a first time period, all of the cores are allocated to the first job, which executes on five of them (C1, C2, C3, C4, and C5). In a second time period, all of the cores are allocated to the second job, which executes on four of them (C1, C2, C3, and C4). In a third time period, all of the cores may again be allocated to the first job, which executes on only two of them (C1 and C2), and in a fourth time period, all of the cores may again be allocated to the second job, which executes on only one of them (C1). As illustrated in FIG. 5A and FIG. 5B, neither of these approaches is able to take advantage of peaks and troughs in the resource demands of the two jobs.

FIG. 5C illustrates the application of a dynamic spatial allocation policy in which processor cores (or hardware contexts thereof) may be dynamically re-allocated in response to peaks and troughs in the resource demands of multiple concurrent jobs. In this example, during the first time period, cores C1, C2, and C3 are allocated to the first job (which executes on all three of them), and cores C4, C5, and C6 are allocated to the second job (which executes on all three of them). However, for the second time period, one of the cores that was originally allocated to the second job (C4) has been re-allocated to the first job. Therefore, the first job is able to execute on four cores (C1, C2, C3, and C4), while the second job executes only on two of the cores that were originally allocated to it (C5 and C6). Note that with this approach, both of the jobs are able to complete their executions within two time slices, rather than in three or four time slices, as with the approaches illustrated in FIGS. 5A and 5B, respectively.

As described herein, the check-in protocol may be co-operative. In some embodiments, the runtime system may be expected to check-in at times when preemption would be convenient (e.g., to ensure that it yields cores between batches of loop iterations, rather than within a batch). The check-in tests may be made by the runtime system, without needing to make any changes to the application code. As previously noted, in some embodiments, a periodic "run-away timer" may be implemented that is configured to force a check-in operation if one does not occur within the required interval. In some embodiments, this may be done in user mode within the runtime system itself. In other embodiments, such a timer may be implemented in the kernel to enforce check-ins, if necessary. In one embodiment, by default, the two hysteresis delays may be set to 10 ms, the $P_{high}$ delay may be set to 100 ms, and the $P_{low}$ delay may be set to 1 ms.

As previously noted, in some embodiments, the resource management components may maintain a table in shared memory that holds per-hardware-context information. For example, for each hardware context, the table may store an indication of which job has high priority for that context, an indication of which job is currently running on the context, context-local timestamp values indicating when the next check-in is due and when the hysteresis delay ends, per-job flags each indicating whether that job wishes to run on the context, and/or a pthread mutex and condition variable used by jobs to block and/or wake up when passing hardware contexts to one another. Note that, in some embodiments, there may be a multiple condition variables for each hardware context, such as one per job. By using multiple condition variables, instead of a single condition variable, jobs may be woken selectively. In some embodiments, a processor cycle counter may be used to provide fast access to context-local timestamps. In addition, because timestamps may only be compared between software code running on the same hardware context, it may not be necessary for these timestamps to be synchronized across different processors. Note also that the user application may not have access to nor a need to know about the information stored in the co-ordination table. In some embodiments the indication of the job that has been granted high priority for a given context may be recorded when the baseline allocations are performed for that job (e.g., in accordance with to a spatial scheduling policy). Subsequently, the table may be updated to record which job is actually running on the given hardware context, and the time stamp value for when the next check-in is due. Note that the job that is actually running on the given hardware context may be a different job than the one that has high priority on the given hardware context, e.g., if the high priority job does not have any work to execute on that context.

In general, it may be advantageous for jobs to check in frequently, so that if a new job starts or if the high-priority job has work available, the hardware contexts may be re-allocated, if necessary, in a fairly quick manner. In some embodiments, the co-ordination table may be protected by a lock (e.g., to control write accesses). However, in the common case, a check-in test may not need to acquire the lock, but may simply confirm that the next check-in time is after the current timestamp. When the next check-in time is reached, the full check-in operation may be configured to determine which job should run on the given context (e.g., using a deterministic function of the shared state). When switching jobs, the yielding job may signal other jobs waiting on the condition variable before blocking.

In some embodiments, the timestamps within the shared data structure (table) may be used to avoid responding too quickly to changes in the resource demands of the applications. For example, some applications have interspersed serial phases and parallel phases, (e.g., in OpenMP, this may be expressed as a parallel loop that is followed by a small amount of sequential work before the start of the next parallel loop). If care is not taken, in this case, a hardware context may be allocated to an application when it is in the parallel loop, and then in the brief sequential section, it may be re-allocated to a different application, only to discover that it is needed back very quickly. One of the problems seen in existing operating systems (from a performance standpoint) is that those systems are often very eager to make sure that hardware resources get used when they are available. These systems interact badly with applications that have bursts in their resource demands, because in between the bursts, they may re-allocate needed resources.

In some embodiments, an approach that may mitigate over-eager re-allocations, is that within the shared table, an application may publish a timestamp indicating when it last finished using a given hardware context, and the resource management components may only consider re-allocating that hardware context to a different application after a certain delay has elapsed after the published timestamp. This hysteresis delay, which is described above, may allow an application to retain resources for up to this amount of time after it is finished using them, in the expectation that it is likely to need to use them again soon.

In some embodiments, an up-call interface to a resource-management-enabled parallel runtime system may be used to pass control to the runtime system. The following OpenMP loop may serve as a running example:

```
#pragma omp parallel for schedule(dynamic,100)
for (int i = 0; i < 1000000; i++) {
    arr[i] *= 2;
}
printf("Done\n");
```

In this example, the loop iterates over a large array (arr), doubling each element. The pragma indicates that the iterations can run in parallel, and that threads should share the work by dynamically claiming batches of 100 iterations. In this example, "Done" is printed only after all of the iterations have completed. An OpenMP compiler would typically extract the body of the loop into a separate function, and create a data structure holding the bounds of the loop and a shared counter to indicate the next batch of iterations to be claimed. Threads may use an atomic increment on the shared counter to claim a batch of iterations, run those, and then return for more.

In some embodiments, a resource-management-enabled parallel runtime system may operate by dispatching work to run over a set of workers which a resource management component provides. A job may be expressed as a set of work tickets, each of which represents a source of parallelism. For example, a parallel OpenMP loop may be represented by a single work ticket. When a worker is allocated a hardware context, it may execute parts of a work ticket by making an up-call to a resource-management-enabled parallel runtime system at a fixed entry point. The code at that entry point may then execute part of the work (e.g., a batch of loop iterations). The entry point may be referred to as the runtime system's activation handler, and each up-call may be referred to as an activation.

Conceptually, every job may have one worker for each hardware context in the machine. In some embodiments, the number of workers that are actually running may vary over time under a dynamic spatial scheduling policy. Fixing workers to hardware contexts, rather than having them migrate within a machine, may enable the runtime system to cache information about the physical structure of the machine (e.g., which workers are co-located on the same core), and to use that information to build data structures, such as structures that include scalable non-zero indicators (e.g., SNZI trees). In some embodiments, this approach may support only homogeneous systems. However, such as fixed-worker model may be extended to support heterogeneous systems, in other embodiments.

In some embodiments, a variety of APIs may be provided for creating and managing work in the systems described herein. These APIs may include APIs for operations that are exposed by the resource management components, APIs for operations that are implemented by a resource-management-enabled parallel runtime system, and APIs for operations that are used for coordination between jobs. For example, in some embodiments, the operations exposed by the resource management components may include the following:

```
// Start-of-day
Worker[ ] CreateWorkers( );
// Managing work
uint64_t CreateWorkTicket(void *data, int max_concurrency);
void SetTicketDrained(uint64_t ticket);
void WaitTicketDrained(uint64_t ticket);
void WaitTicketComplete(uint64_t ticket);
```

In this example, the operations shown above are exposed by the library that implements the functionality of the resource management components and to which the runtime systems make calls. In the example API shown above, the CreateWorkers function may be used at the start-of-day to initialize a job's workers. In some embodiments, each worker may be implemented by a software thread (e.g., a pthread) that is pinned to the associated hardware context, and may be blocked on the hardware context's condition variable when it should not receive the CPU. Each worker may be in one of two states: waiting (e.g., created, but either waiting for work to run, or waiting for synchronization within its current work), or runnable (e.g., having work to execute, whether or not it is actually running on its hardware context). Workers may start in the waiting state, as simply creating a set of workers may not cause any computation to happen.

The other three operations shown above may be used to control when a work ticket is being executed. For example, once a work ticket has been created, a resource management component may make the activate calls onto the runtime system whenever that application is given a hardware context, and the application may need a way to indicate that all of that work has now been started (e.g., to indicate that it no longer needs to be activated and those hardware resources can be re-allocated to another application). In the example API shown above, this functionality is provided by the runtime system calling SetTicketDrained. For example, in a resource-management-enabled version of OpenMP, this function may be called once all of the iterations of the loop have been started (even if some are still in progress). In this case, there may be no need to receive further activations because all of the work that is available has started being executed. In the example API shown above, the operations WaitTicketDrained and WaitTicketComplete may be used by the runtime system for synchronization, e.g., to cause a job to wait until all of the iterations have been started or to wait until all of the iterations have both been started and have finished the final (complete operation), respectively. In some embodiments, one of these operations may be called at the end of a loop (e.g., if the runtime system wishes to wait until all of the work in the preceding loop has been finished before it starts a subsequent loop, as is common in many OpenMP applications).

In some embodiments, the shared table stores information indicating which hardware contexts an application is requesting, and this information is updated in response to these calls. In such embodiments, when a work ticket is created, the resource management component that create it may update the table to indicate that these additional hardware contexts can be used if they are allocated to this application. In some embodiments, when a work ticket is drained (and assuming there are no other work tickets from that application), then the shared work table may be be updated again to indicate that these hardware contexts can no longer be used by this application.

In some embodiments, the operations implemented by the resource-management-enabled parallel runtime systems may include the following:

void Activate(Worker *w, void *data, uint64_t ticket);

In some embodiments this function may serve as the entry point for the up-calls that the resource management component makes into the runtime system when allocating a hardware context. In some embodiments, the operations that the resource management component exposes are the ones used by the runtime system making the check-in calls, which are described below. For example, the operations used for co-ordination between jobs may include the following:

```
bool ShouldYield( );
void YieldPoint( );
```

In the example API shown above, the ShouldYield operation may return a flag to the application indicating whether or not it should relinquish its hardware context, and the YieldPoint operation may perform the actual check-in operation itself. In some embodiments, YieldPoint may either return immediately (e.g., if the application does not need to yield the hardware context) or may relinquish that hardware context and return only when the hardware context is given back to the application. In some embodiments, these operations may be used by the runtime system (e.g., a resource-management-enabled OpenMP runtime system) to make sure that any preemption happens at a convenient time. For example, in the case of a loop that has a large number of iterations to execute, the OpenMP runtime system may execute a small number of those iterations in each of the up-calls that it receives to the activate function and then may check (e.g., by calling ShouldYield) whether it should execute another batch of iterations or should return from the activate call (and, potentially, yield the corresponding hardware context to another application).

As previously noted, a work ticket may represent a source of parallel work that the runtime system wishes to execute over the resources that it receives. In some embodiments, the CreateWorkTicket operation shown above may take two parameters: an opaque data pointer which is passed back to the activation handler when running this ticket, and a bound on the maximum number of concurrent activations that should occur. In the OpenMP example, this maximum number of concurrent activations may come from the OMP_NUM_THREADS environment variable that OpenMP uses to set the number of software threads used. In other words, although it is not typically used, OpenMP provides a facility for the programmer to specify the number of threads that should be used to execute a loop (if the programmer chooses to use that feature) and this value may be used in a resource-management-enabled version of OpenMP as the bound on the maximum number of concurrent activations that should occur. For example, in some embodiments, the programmer may use this mechanism to indicate that it is only profitable to use four hardware threads for a given loop, based on the knowledge that there is so much interference between the threads that the execution would not scale well beyond that. In some embodiments, the data pointer value that it passed to the CreateWorkTicket operation may identify a particular parallel for loop that is going to be executed, may indicate what the body of the loop is, may indicate how many loop iterations are left to be executed, and/or may indicate any other information that the runtime system chooses to maintain for a particular piece of parallel work In some embodiments, a work ticket may always be in one of three states: active (e.g., created and able to run), drained (indicating that all of the work has been started, so further activations are unnecessary), or complete (indicating that all of the work has finished, rather than simply being in progress). In the example shown above, SetTicketDrained may be called when the final batch of loop iterations starts, and the main thread may call WaitTicketComplete before printing "Done".

As previously noted, an activation may execute part of a work ticket. For example, in some embodiments, one of the workers created by the resource management component may make an up-call to the runtime system's Activate function identifying the worker on which the up-call starts, the data pointer from the work ticket on whose behalf it will perform work, and an identifier of the work ticket itself. In one example, the pointer may identify an OpenMP structure describing the parallel loop. In some embodiments, activations are intended to be short-lived and to co-operate with the spatial scheduling algorithm. In such embodiments, when invoked, an activation handler may perform work in the runtime system, perform check-in operations regularly (e.g., by calling ShouldYield), and then return when told to yield.

Activations may be naturally short-running when executing parts of loops, or small tasks from a work-pool. However, there are two cases in which an activation might not be short-lived. In the first case, an activation may block using the synchronization mechanism described below. If this happens, the activation will be resumed once it unblocks (possibly on a different worker). Such activations may be referred to as orphaned activations, and workers may run these orphaned activations in preference to starting new activations, in some embodiments. In some embodiments, in order to let long-running activations move between workers, each up-call may run on its own stack, independent from the one used within the resource management components.

The second reason that an activation may not be short-lived is that it may simply run without blocking. In some embodiments, to avoid requiring manual stack-ripping, the activation may periodically call YieldPoint. If requested to yield, the current activation may be suspended and added to the job's set of orphaned activations. In an example OpenMP implementation, yield points may be added within the OpenMP runtime system, without requiring changes in application code. In some embodiments, if the activation does fail to return, block, or yield, a runaway timer (such as that described above) may force it to yield.

Figure 6:
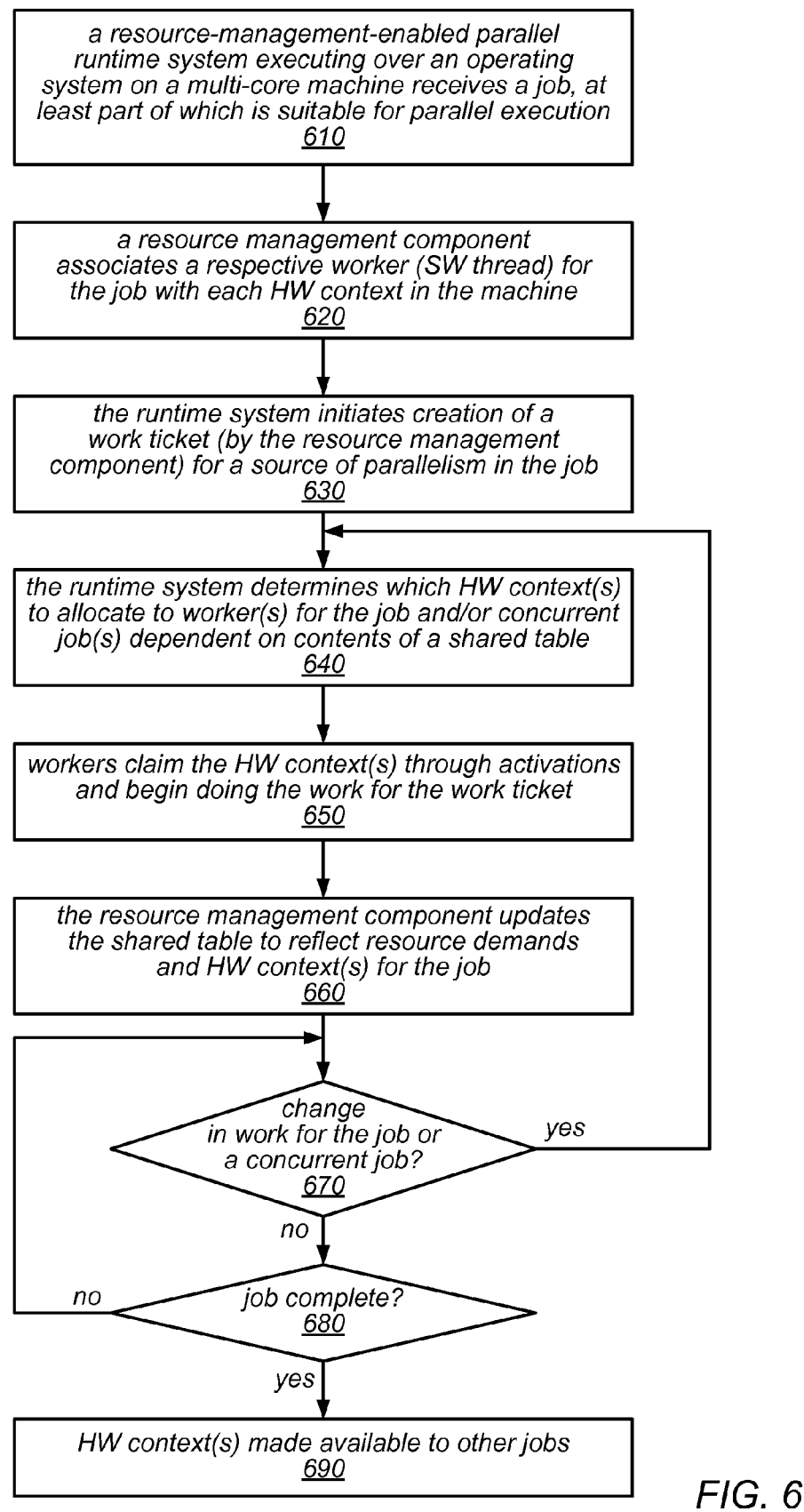
FIG. 6 is a flow diagram illustrating one embodiment of a method for managing hardware context allocations using work tickets and a shared table of per-hardware-context information about resource demands and usage.

One embodiment of a method for managing hardware context allocations using work tickets and a shared table of per-hardware-context information about resource demands and usage is illustrated by the flow diagram in FIG. 6. As illustrated at 610, in this example, the method may include a resource-management-enabled parallel runtime system that is executing over an operating system on a multi-core machine receiving a job, at least part of which is suitable for parallel execution. The method may include a resource management component associating a respective worker (e.g., a software thread) for the job with each hardware context in the machine, as in 620. The method may also include the runtime system initiating the creation of a work ticket (e.g., by the resource management component) for a source of parallelism in the job, as in 630. For example, in some embodiments, the runtime system may invoke a library function implemented by the resource management component to create a work ticket for a parallel computation implemented using a for loop or using another type of parallel execution mechanism.

As illustrated in this example, the method may include the runtime system determining which hardware context(s) to allocate to worker(s) for the job and/or for concurrent job(s) dependent on contents of a shared table (e.g., a shared table of per-hardware-context information about resource demands and usage), as in 640. The method may include workers claiming the hardware context(s) allocated to them through activations and beginning to do the work for the work ticket, as in 650. For example, in some embodiments, each such worker may make an up-call to the activate function of the runtime system. The method may also include the resource management component updating the shared table to reflect the current resource demands and allocated hardware context(s) for the job (and, in some cases, other concurrent jobs), as in 660.

When and if there is a change in the work (and therefore, the resource needs) for the job or a concurrent job (shown as the positive exit from 670), the method may include repeating at least some of the operations illustrated in FIG. 6 (beginning at element 640) in order to re-allocate some or all of the hardware contexts as necessary (e.g., according to various applicable policies) and continuing execution of one or more jobs. For example, such a re-allocation may be performed in response to the starting and/or completing of various items of work or batches of work items, in response to an executing job reaching completion and/or in response to the submission of an additional job. Note that, as described in more detail below, some of the conditions that can trigger such a re-allocation may be detected during execution of a check-in operation. In the example illustrated in FIG. 6, when and if a re-allocation is performed, the machine may allocate one or more of the hardware contexts to perform work items for the same job on whose behalf the hardware contexts were previously allocated, and/or may allocate one or more of the hardware contexts to different jobs than the ones on whose behalf the hardware contexts were previously allocated (assuming they have runnable work). While the work (and resource requirements) for the job and for concurrently executing jobs does not change during execution (and while the job is not yet complete), the method may include the machine continuing to perform work using the currently allocated hardware contexts until there is a change in the work for one or more jobs that prompts re-allocation of at least some of the hardware contexts or until the job is complete. This is illustrated in FIG. 6 by the path from the negative exit of 670 to 680 and from the negative exit of 680 to 670. Once the job is complete, shown as the positive exit from 680, the method may include making the hardware context(s) previously allocated to the job available to other jobs, as in 690. For example, the method may include the runtime system re-allocating the hardware contexts that were allocated to the job to other jobs (if they have runnable work).

Figure 7:
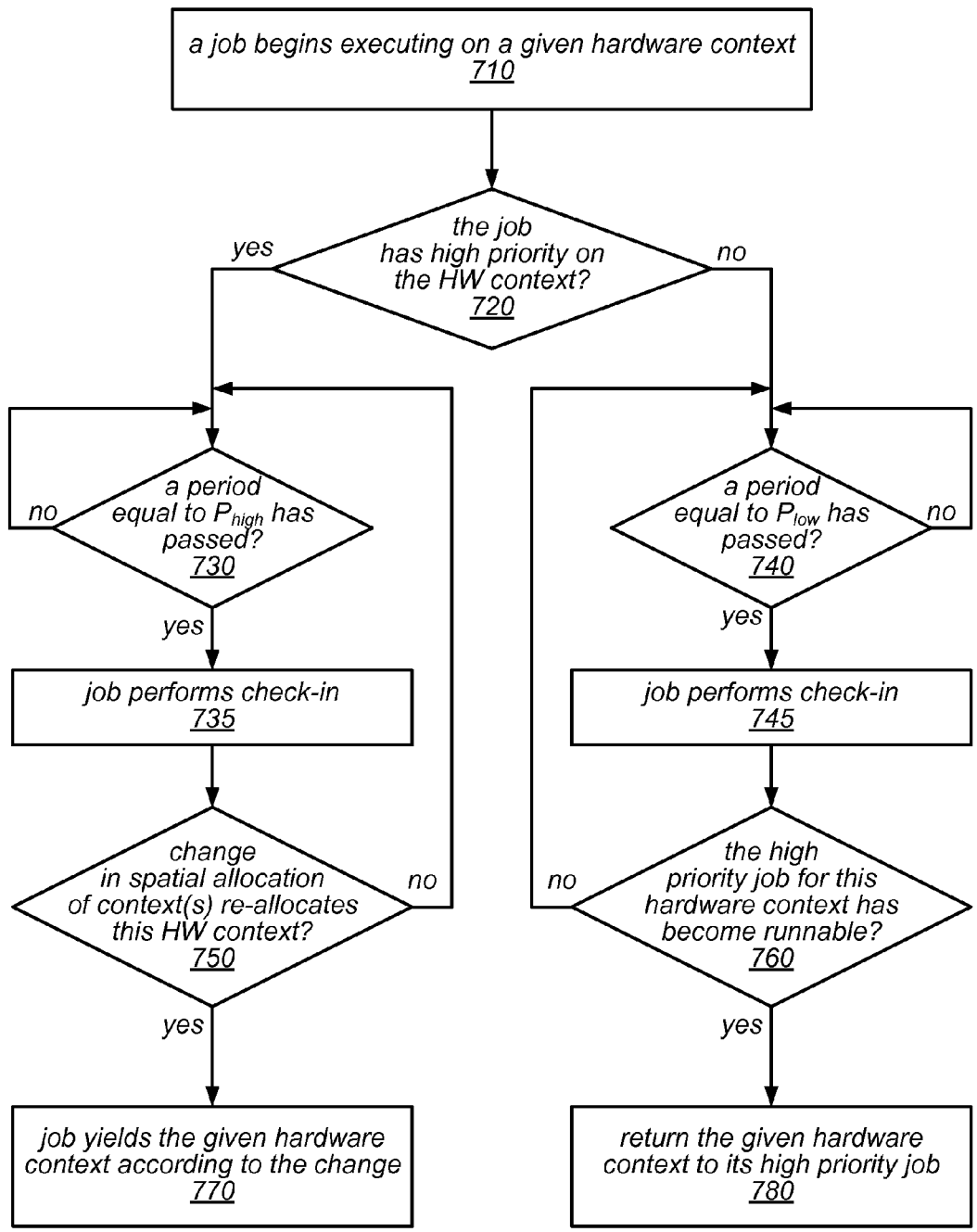
FIG. 7 is a flow diagram illustrating one embodiment of a method for performing a check-in process.

One embodiment of a method for performing a periodic check-in process is illustrated by the flow diagram in FIG. 7. This diagram illustrates how the runtime system uses the CPU time it receives to execute jobs (e.g., by performing a piece of work and then performing a check-in operation to determine whether a hardware context should be yielded to another application). As illustrated at 710, in this example, the method may include a job beginning to execute on a given hardware context (e.g., one of multiple hardware contexts allocated for the job). If the job has been granted a high priority on the given hardware context (shown as the positive exit from 720), the method may include the job retaining the given hardware context on which it has high priority until a delay period equal to $P_{high}$ has passed or until it runs out of work to execute on the given hardware context. This is illustrated in FIG. 7 by the feedback from the negative exit of 730 to its input. Note that if, at any point, the job runs out of work to execute on the given context, the method may continue as illustrated in FIG. 4 (beginning with the positive exit of element 430) and described above.

Once a delay period equal to $P_{high}$ has passed (shown as the positive exit from 730), and assuming that the job still has more work to execute on the given hardware context, the method may include the job performing a check-in operation, as in 735. More specifically, the job may perform a check-in operation to determine whether there have been any changes to the spatial allocation of hardware contexts (e.g., based on a dynamic spatial scheduling policy) that affect the job. For example, changes may be made to the spatial allocation of hardware contexts in response to a change in the number of jobs that are executing in the system or a change in the priority of one or more jobs. If a change in the spatial allocation of hardware context(s) re-allocates the given hardware context (shown as the positive exit from 750), the method may include the job yielding the given hardware context in accordance with the change (as in 770). Otherwise, if no change in the spatial allocation of hardware context(s) re-allocates the given hardware context (shown as the negative exit from 750), the method may include continuing to execute the job on the given hardware context until the next periodic check-in time (e.g., after resetting a delay counter or updating a check-in time in a shared data structure) or until the job runs out of work to execute on the given hardware context. This illustrated in FIG. 7 by the feedback from the negative exit of 750 to 730.

Similarly, if the job does not have high priority on the given hardware context (shown as the negative exit from 720), the method may include the job retaining the given hardware context until a delay period equal to $P_{low}$ has passed or until it runs out of work to execute on the given hardware context. This is illustrated in FIG. 7 by the feedback from the negative exit of 740 to its input. Again note that if, at any point, the job runs out of work to execute on the given hardware context, the method may continue as illustrated in FIG. 4 (beginning with the positive exit of element 430) and described above. Once a period equal to $P_{low}$ has passed (shown as the positive exit from 740), and assuming that the job still has more work to execute on the given hardware context, the method may include the job performing a check-in operation, as in 745. More specifically, the job may perform a check-in operation to determine whether the high priority job for the given hardware context has become runnable. If the high priority job for the given hardware context has become runnable (shown as the positive exit from 760), the method may include returning the given hardware context to its high priority job, as in 780. Otherwise, if the high priority job for the given hardware context has not become runnable (shown as the negative exit from 760), the method may include the job retaining the given hardware context until the next periodic check-in time (e.g., after resetting a delay counter or updating a check-in time in a data structure) or until the job runs out of work to execute on the given hardware context. This illustrated in FIG. 7 by the feedback from the negative exit of 760 to 740.

In some embodiments, worker-local and activation-local state may be provided. For example, worker-local state may be used for state that is fixed to a given context (e.g., a work pool for a specific NUMA domain). Activation-local state may be used for information associated with a software thread in the programming model. For example, it may be used to store the current OpenMP thread ID. In this example, the state must follow the activation if it is moved to a different worker.

In some embodiments, the systems described herein may include a unified synchronization mechanism for waiting. This API may be used by runtime systems (such as OpenMP) that are built over the resource management components described herein to express the synchronization constructs that the runtime system needs. For example, it may be used by runtime systems to provide abstractions for use by programmers (e.g., mutexes and barriers that the application code requires), and may also be used within the resource management components themselves in the functions that manage synchronization on work tickets and activations (e.g., in the implementation of the WaitTicketDrained or WaitTicketComplete functions). Using a common abstraction across these different levels may allow spin/block decisions to be made consistently and in a single place. For example, this API may provide mechanisms for determining (under various circumstances) whether to yield a hardware context immediately to an orphaned activation, spin in the absence of other work to execute, or yield a hardware context to another job.

Note that in some cases, spinning may be more efficient from a thread's own point of view (e.g., because a spinning thread is watching the condition that it is waiting for and can respond quickly when the condition changes to allow it to continue). However, blocking may be more efficient from a system-wide point of view (e.g., because it allows an application to give up resources and pass them to a different application that may be better able to make use of them). Since the systems described herein are concerned with handling multiple applications on the same machine, they may provide places at which these policy decisions about whether to spin or whether to block are made and are possible to make (e.g., using an active policy that leads to applications keeping resources and spinning or a passive policy that leads to applications blocking).

In some embodiments, the systems described herein may include a common synchronization mechanism that is built around two abstractions: latches and synchronization variables (SVars). As described in more detail below latches are mutual exclusion locks that are intended to be held only for short durations, and synchronization variables represent the pieces of data that the latches protect. In some embodiments, each synchronization variable may be protected by a given latch in a consistent way. For example, one latch might protect multiple synchronization variables (e.g., a dozen of them) and that relationship may be maintained consistently, rather than using one latch at one point and a different latch at different point.

The synchronization API exposed by C may include the following:

```
// Latches
void LatchInit(Latch *1);
void LatchAcquire(Latch *1); void LatchRelease(Latch *1);
// Synchronization variables (SVars)
void SVarInit(SVar *s, int v);
int SVarRead(SVar *s);
void SVarWrite(SVar *s, int v);
// Blocking
typedef bool (*Sync_fn)(void *data);
void SyncWaitUntilTrue(Latch *1,
    Sync_fn *fn,
    void *data);
// Control over activations
void SuspendAct(act **ap);
void ResumeAct(act *a);
```

Note that this synchronization API may be intended only for use by expert programmers. Consequently, in some embodiments design decisions may be taken to optimize performance rather than to ensure the correct use of the API. In other embodiments, API usage may be checked dynamically. As noted above, the API provides two abstractions: latches and synchronization variables (SVars). In some embodiments, a latch (as used in the resource management components and resource-management-enabled parallel runtime systems described herein) may be a mutual exclusion lock that is used to protect other synchronization data structures (e.g., a full/empty flag for a work pool). In some embodiments, latches are never held when waiting. In some embodiments, an SVar encapsulates a single integer value, with read and write functions. As noted above, each SVar must be protected consistently by a latch. For example, the latch must always be held when updating the SVar, and the programmer may need to ensure this.

In some embodiments, blocking may be done by calling SyncWaitUntilTrue with a predicate over SVars that will be true when it is possible to continue. The result of this predicate must depend only on the contents of SVars protected by the latch that is passed to the SyncWaitUntilTrue function. Furthermore, the predicate must be written carefully so that it can be "probed" without acquiring the latch (e.g., it should not loop or crash if it sees an inconsistent set of values in the SVars). In some embodiments, the latch must be held before calling SyncWaitUntilTrue, and it may be re-acquired by the implementation before returning.

In some embodiments of the systems described herein, OpenMP barriers may be implemented using an integer counter that is atomically decremented with fetch-and-add on arrival at the barrier, counting down to 0 when all of the OpenMP threads have arrived. In this example, the last thread to arrive may briefly acquire a per-barrier latch and increment a per-barrier generation number held in an SVar. If an OpenMP thread is not the last to arrive, it may block, waiting for a change to the generation number. In some embodiments, of the systems described herein, OpenMP-level mutexes may be implemented using an MCS-style list of per-OpenMP-thread queue nodes. These lists may be constructed using atomic compare-and-swap type operations. In this example, each queue node may hold a latch and a single SVar, and an OpenMP thread blocking on a mutex may set the SVar to 0 before calling SyncWaitUntilTrue to wait for the SVar to become 1.

In some embodiments, the use of the SyncWaitUntilTrue abstraction may provide the flexibility to use a combination of different implementation techniques. In doing so, the aim is to provide a unified place at which spin/block decisions can be made, taking into account synchronization within the runtime system (e.g., at an OpenMP barrier) and synchronization within the resource management components (e.g., waiting for a work ticket to be completed). In some embodiments, the predicate can be evaluated either by the waiter (which may spin until the predicate is true), or the predicate can be held in a queue attached to a latch and re-evaluated whenever the latch is to be released. In some embodiments, this re-evaluation may occur only after making an update to one of the SVars protected by that latch.

In some embodiments, a latch may be implemented as an integer version number and a linked list of wait-queue entry structures. In such embodiments a latch is unlocked if and only if its version number is even. In some embodiments, the LatchAcquire function shown above may spin until the version number is even, before using an atomic compare-and-swap type operation to increment it, making it odd. In this example, the latch protects the chain of wait-queue entries that are stack-allocated by the waiters. In this example, the LatchRelease function may process the queue (as described below) before incrementing the version number to release the latch.

In some embodiments, the SyncWaitUntilTrue function may take a latch, a synchronization function (which may also be referred to as a predicate), and a data value as inputs. In some embodiments, a call to the SyncWaitUntilTrue function must be made when the caller already holds the latch, and the function may test whether the predicate passed to the synchronization function is true at that point. If the predicate evaluates true, the SyncWaitUntilTrue function may return immediately. If not, the SyncWaitUntilTrue function may delay either by spinning or blocking until the predicate passed to the SyncWaitUntilTrue function evaluates true. In this case, while the caller is delayed, it may release the latch that was passed into the SyncWaitUntilTrue function.

One example of a way in which a runtime system can build over this API, is the use of a latch to protect the data that a particular synchronization abstraction needs (e.g., a mutex, and the flag that indicates whether the mutex is held or not). In this example, the flag would be a synchronization variable. In this example, acquiring the mutex may include acquiring the latch, calling SyncWaitUntilTrue, and passing in a predicate that will test the synchronization variable and determine whether the mutex is already acquired by some other thread or not. As illustrated in this example, a synchronization function (predicate) that expresses whether or not the calling/waiting thread can continue may be passed in explicitly to the SyncWaitUntilTrue, rather than relying on the caller to evaluate a function over a condition variable. Note that this synchronization function may be private to the thread that is waiting (e.g., the thread that called the SyncWaitUntilTrue function). In some embodiments, the caller to the SyncWaitUntilTrue function must ensure that the latch is already held and the predicate is already false. In such embodiments, the implementation of SyncWaitUntilTrue may not need to test the predicate before waiting.

In some embodiments, when a thread is waiting, it may store a reference to the synchronization function (predicate) in a list held in shared memory associated with the latch that was passed in to SyncWaitUntilTrue. This may allow multiple different waiting conditions to be shared between all of the threads in the application. In some embodiments, when a thread other than the waiter updates the synchronization data structure (e.g., when some other thread releases a mutex, in the OpenMP example), that thread may look at the synchronization functions of the other threads to see which (if any) are waiting to acquire the mutex, and may wake up one of those waiting functions if it was waiting for something that has now become true. In other words, in systems in which the synchronization functions are published, a thread that is releasing a lock can determine which other threads might be able to make progress.

In various embodiments, there may be different versions of the SyncWaitUntilTrue function (e.g., for active vs. passive implementations). For example, an active implementation may be based on spinning and on having a thread repeatedly check the synchronization function (predicate). In some embodiments, an active implementation of SyncWaitUntilTrue(l,fn,d) may start by testing the predicate fn(d). If it evaluates true, the SyncWaitUntilTrue function may return immediately. If the predicate evaluates false, the SyncWaitUntilTrue function may release the latch and spin until the latch has been locked and unlocked at least once. Note that since fn(d) depends only on SVars protected by the latch, the predicate's value can change only after the lock has been held. In some embodiments it may be assumed that watching the single version number is faster than repeatedly probing the predicate. After observing a change, fn(d) may be probed and, if it evaluates true, the latch may be re-acquired, fn(d) may be tested once again and, if it still evaluates true, SyncWaitUntilTrue may return. Otherwise, the SyncWaitUntilTrue function may repeat.

In various embodiments, a passive implementation of the SyncWaitUntilTrue function may be based on blocking, enqueuing on a list that is associated with a latch, the synchronization function (predicate) and the data, and then the caller yielding its hardware context until another worker releases the latch (after making an update to the synchronization structure and seeing that the waiting thread is now allowed to continue). In other words, in this implementation, responsibility for wake-ups may be passed to the LatchRelease function. For example, calling the SyncWaitUntilTrue function may cause it to probe the predicate to determine whether it evaluates false. If so, the SyncWaitUntilTrue function may initialize a stack-allocated wait-queue structure, and then the activation may yield (e.g., by calling SuspendAct to store a handle for the current activation in the wait-queue). When resumed, the SyncWaitUntilTrue function may re-acquire the latch, check that the predicate remains true, after which the SyncWaitUntilTrue function returns, or the function repeats. In this example, the LatchRelease function may be responsible for waking activations, testing the predicates in the queue if it is nonempty. For any predicates that are true, the LatchRelease function may remove the queue entry, and may call ResumeAct to add the activation to the pool of orphaned activations for execution by the job's workers.

In some embodiments, these two implementations of the SyncWaitUntilTrue function may be combined in a conventional spin-then-block approach. For example, the active implementation may be used initially (e.g., until the worker is requested to yield to another job, until there is an orphaned activation available to run, or until a configurable spinning limit is reached), after which the passive implementation may be used. In one embodiment, a spinning limit may be set at 100 k cycles, but the results of various experiments indicate that performance is not sensitive to the exact value chosen.

Figure 8:
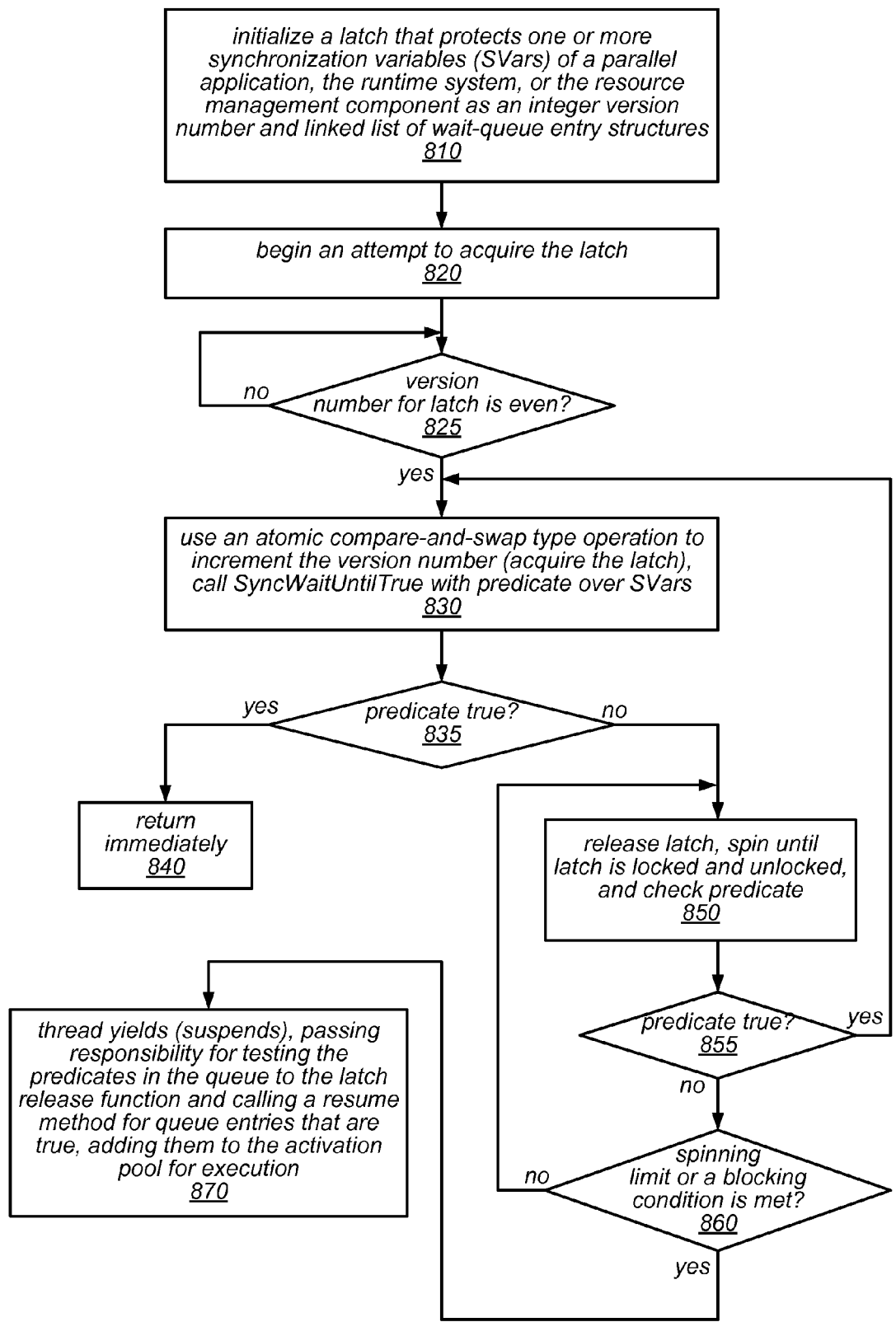
FIG. 8 is a flow diagram illustrating one embodiment of a method for providing a synchronization mechanism using a latch and one or more synchronization variables.

One embodiment of a method for providing a synchronization mechanism using a latch and one or more synchronization variables is illustrated by the flow diagram in FIG. 8. As illustrated at 810, in this example, the method may include initializing a latch that protects one or more synchronization variables of a parallel application, the resource-management-enabled runtime system over which it executes, or a resource management component as an integer version number and linked list of wait-queue entry structures. For example, the latch may protect a synchronization variable that is used in blocking, such that execution of the blocked thread can continue only when its value causes a predicate passed to the SyncWaitUntilTrue method to be true. The method may include beginning an attempt to acquire the latch (as in 820). In the example illustrated in FIG. 8, if the version number for the latch is not even (shown as the negative exit of 825), the method may include spinning until the version number is even. If (or once) the version number for the latch is even (shown as the positive exit from 825), the method may include using an atomic compare-and-swap type operation to increment the version number (and thus, to acquire the latch), and then calling a SyncWaitUntilTrue function with a predicate over the SVars (as in 830). Note that in other embodiments, a latch may be implemented such that odd values (or one or more specific pre-defined values) represent an "unlocked" state, rather than any and all even values representing an "unlocked" state (as in the example illustrated in FIG. 8).

If the predicate evaluates true (shown as the positive exit from 835), the method may include returning immediately (as in 840). Otherwise, if the predicate does not evaluate true (shown as the negative exit from 835), the method may include releasing the latch, spinning until the latch is locked and unlocked at least once, and checking the predicate again (as in 850). If the predicate still evaluates true (shown as the positive exit from 855), the method may include acquiring the latch, checking the predicate again, and continuing as before. This is illustrated in FIG. 8 by the feedback from the positive exit of 855 to 830. If (at 855) the predicate no longer evaluates as true, the method may include waiting until the latch is locked and unlocked again, then spinning until a spinning limit or a blocking condition is met (shown as the feedback from the negative exit of 860 to 850). For example, in some embodiments, the method may include continuing to evaluate the predicate until the worker is requested to yield to another job, until there is an orphaned activation available to run, or until a configurable spinning limit is reached. Once a spinning limit or a blocking condition is met (shown as the positive exit from 860), the method may include the thread yielding (suspending its activation), passing responsibility for testing the predicates in the queue to the latch release function, and calling a resume method for queue entries that evaluate true, adding them to the activation pool for execution (as in 870).

In some embodiments, while holding a latch, a flag may be maintained that records whether or not any SVars have been updated. In some embodiments, the option of waking threads may only be considered if writes have been made. In some embodiments, a "hand-off" wake-up policy may be applied in which at most one activation would be woken per release of the latch. In turn, that first activation may be responsible for waking up a second wait queue entry after it has released the latch. This approach may avoid multiple activations being woken and stampeding for the latch (since they must all acquire the latch before making progress). In some embodiments, specialized versions of the SyncWait-UntilTrue function described above may be provided for common cases (e.g., for the case in which a thread is waiting until a single SVar holds a specific value). In another example, variants of the SyncWaitUntilTrue function may be provided in which the caller guarantees that the predicate is false initially.

The techniques described herein for implementing dynamic co-scheduling of hardware contexts for parallel runtime systems were demonstrated by building two prototype resource-management-enabled runtime systems. The first is a resource-management-enabled version of the OpenMP runtime system. As previously noted, OpenMP is a conventional runtime system for parallel programming. In OpenMP, the primary way that the program expresses work that can be split over multiple hardware contexts is by using a parallel for loop, and batches of the loop iterations can be executed in parallel on the different hardware contexts.

In some embodiments, in a resource-management-enabled version of OpenMP, when the runtime system receives CPU time, it may perform one batch of the loop iterations on a particular hardware context before performing a check-in operation to determine whether it should yield that hardware context. If the runtime system has a small number of hardware contexts, each one may perform a large number of the batches, but if it has a large number of hardware contexts, each one may perform a small number of the batches. In some embodiments, by having these check-in points in between the executions of batches of loop iterations, situations in which the runtime system yields the CPU in the middle of a batch may be avoided, thereby avoiding threads becoming stragglers. Note that these check-in points may be placed in such a way that check-in operations are performed at points where it is convenient for the runtime system to yield resources if it is requested to use fewer of them.

Again note that an application that submits work to be executed in parallel on a system that implements a resource-management-enabled version of OpenMP may use standard OpenMP APIs to express its work. While the application itself may be unmodified, the OpenMP runtime system may be modified to use worker threads created by the resource-management-enabled version of OpenMP instead of using ordinary threads created by the operating system, in some embodiments. In such embodiments, a resource management component such as that described herein may be responsible for handling coordination between multiple applications in order to match the number of hardware contexts that the applications are using to the resources that are available in the machine. In some embodiments, by having that integration between the modified OpenMP runtime system and the allocation of resources, the preemption problems that can occur when using ordinary threads may be avoided.

Figure 9:
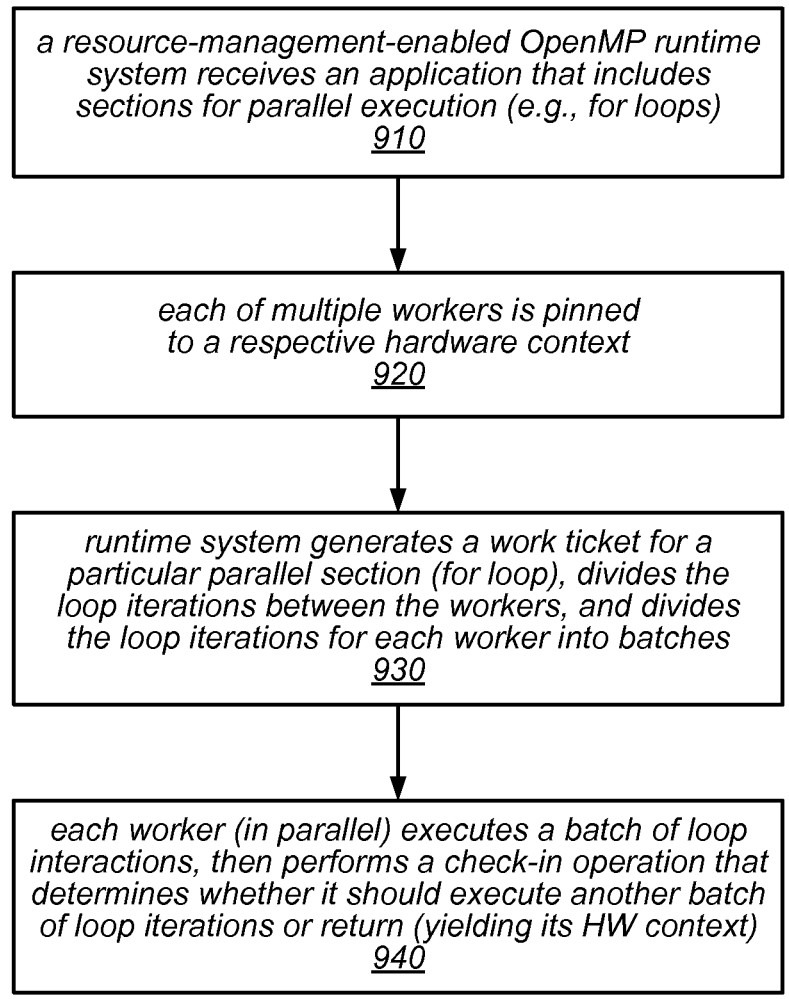
FIG. 9 is a flow diagram illustrating one embodiment of a method for using a resource-management-enabled OpenMP runtime system.

One embodiment of the use of a resource-management-enabled version of an OpenMP runtime system is illustrated by the flow diagram in FIG. 9. As illustrated at 910, in this example, the method may include a resource-management-enabled OpenMP runtime system receiving an application that includes sections for parallel execution (e.g., one or more for loops). The method may include pinning each of multiple workers (e.g., software threads) to a respective hardware context, as in 920.

The method may include the resource-management-enabled OpenMP runtime system generating a work ticket for a particular parallel section in the application (e.g., a particular for loop), dividing the loop iterations between the workers, and dividing the loop iterations for each worker into batches, as in 930. The method may also include each worker (in parallel) executing a batch of loop interactions, then performing a check-in operation to determine whether it should execute another batch of loop iterations or return (yielding its hardware context), as in 940. For example, a worker may return if it runs out of work (and still has no work after a delay) or if hardware contexts are to be re-allocated according to a spatial scheduling policy in such a way that the worker is requested to give up its hardware context.

Two challenges to be addressed when creating a resource-management-enabled version of the OpenMP runtime system include: (i) avoiding unnecessary synchronization barriers between parallel sections, and (ii) reducing load imbalance in statically-scheduled loops. One embodiment of a resource-management-enabled version of the OpenMP runtime system that addresses these challenges is described in more detail below. In this example implementation, no changes to the compiler were required, and no changes to OpenMP applications were required in order to run them on the modified runtime system.

As noted above, one issue addressed by the example implementation is avoiding unnecessary barrier synchronization (e.g., avoiding the use of such barriers at the end of loops). For example, in the pseudocode fragment below, iterations from the second loop must not start until the first loop is complete.

```
#pragma omp parallel for
    for (int i = 0; i < 1000000; i++) { ... }
#pragma omp parallel for
    for (int i = 0; i < 1000000; i++) { ... }
```

This constraint is typically enforced with a process-wide barrier, and a thread must participate in the barrier even if it has not executed any loop iterations. This redundant synchronization can occur if the thread was not scheduled on a hardware context between the time that the loop started and the time that it terminated. In some embodiments, this problem may be addressed by decoupling the notion of OpenMP threads from the specific workers that happen to execute pieces of code. In such embodiments, each OpenMP parallel section may be mapped onto a work ticket, with the maximum concurrency set to the number of OpenMP threads to use. Each activation may select the next OpenMP thread, set the activation-local storage of the current software thread to that of the OpenMP thread, and execute the iterations assigned to that thread. Multiple OpenMP threads can therefore be multiplexed over a single software thread. In various embodiments, switching between OpenMP threads may occur in user-mode, typically by a worker starting new activations when earlier ones block at the barrier.

The second issue addressed by the example implementation is that it should avoid introducing load imbalance. OpenMP exposes the number of threads in use to the application, and the OpenMP API provides rules about how threads are assigned work. It would be incorrect for an implementation to vary this in an ad-hoc manner. For example, in the pseudocode fragment below, the static clause indicates that the loop should be divided between threads into equal batches.

```
#pragma omp parallel for schedule(static)
    for (int i = 0; i < 1000000; i++) { ... }
```

Static scheduling is common because it has low overhead costs, in many implementations. Static scheduling may be appropriate when the number of threads is fixed, and the work in each loop iteration is constant. However, multiplexing OpenMP threads over a smaller number of hardware contexts can cause load imbalance. For example, if (in an extreme case) a loop is statically scheduled over 32 software threads, but only 31 hardware contexts are available, one hardware context will execute the work from two software threads in series, doubling the completion time of the loop.

Although it may be tempting to replace static scheduling with dynamic scheduling, doing so may lead to other issues. For example, this may result in a need to modify the compiler or application (which it would be preferable to avoid). In addition, the OpenMP standard dictates cases where iterations in statically scheduled loops must run in identical threads between different loops. Informally, loops must dispatch the same iterations to the same threads. This lets each thread retain local state for the iterations that it handles. Note that an ad-hoc replacement of statically scheduled loops with dynamically scheduled loops would not be compliant with this aspect of the OpenMP standard.

In some embodiments, including in the example implementation described herein, load balancing may be improved by over-subscribing the system with more OpenMP threads than hardware contexts. Static loops may be split between threads in this larger pool of OpenMP threads. These, in turn, may be executed by workers based on the number of workers running and the duration of each batch of iterations. In effect, over-subscription may be thought of as changing a statically scheduled loop into a relatively coarse-grained dynamically scheduled one. Results of experiments that were run using such an implementation show that multiplexing large numbers of OpenMP threads over the resource management component workers is generally faster than using full operating system threads. In other words, in some embodiments, over-subscription may increase the parallel slack of the system.

The techniques described herein for implementing dynamic co-scheduling of hardware contexts for parallel runtime systems were also demonstrated by building an example of a second resource-management-enabled runtime system ("Domino"), providing an implementation of a task-pool-based programming model. This model is based on parallel execution of fine-grained tasks, each typically performing a few memory reads and writes, and running to completion without any synchronization. Domino is based on a programming model in which tasks are spawned when an existing task writes to a memory location with a "trigger" attached to it. In this runtime system constraints can be used to defer the execution of some tasks.

The original Domino implementation uses a fixed number of worker threads, each with a DominoRTS structure holding a work queue, and a per-thread set of tasks whose execution is deferred. In this implementation, if a thread's own queue is empty, it can steal tasks from the work queue of another thread. When all work queues are empty, then items in the deferred sets are promoted to the queues. The original runtime system was not designed for use on shared machines. Instead, threads spin continually while waiting for work. Other existing parallel runtime systems behave in a similar way.

In this example, the resource-management-enabled implementation of Domino begins by allocating one DominoRTS structure per hardware context. These are held in a global list. A single work ticket represents the entire execution of the parallel computation. When activated, the Domino runtime system claims a DominoRTS data structure from the global list. It then executes using the work pool from that structure, stealing work from other structures as required. It calls ShouldYield between tasks, and returns from the activation handler if requested (releasing the DominoRTS to the global pool).

Figure 10:
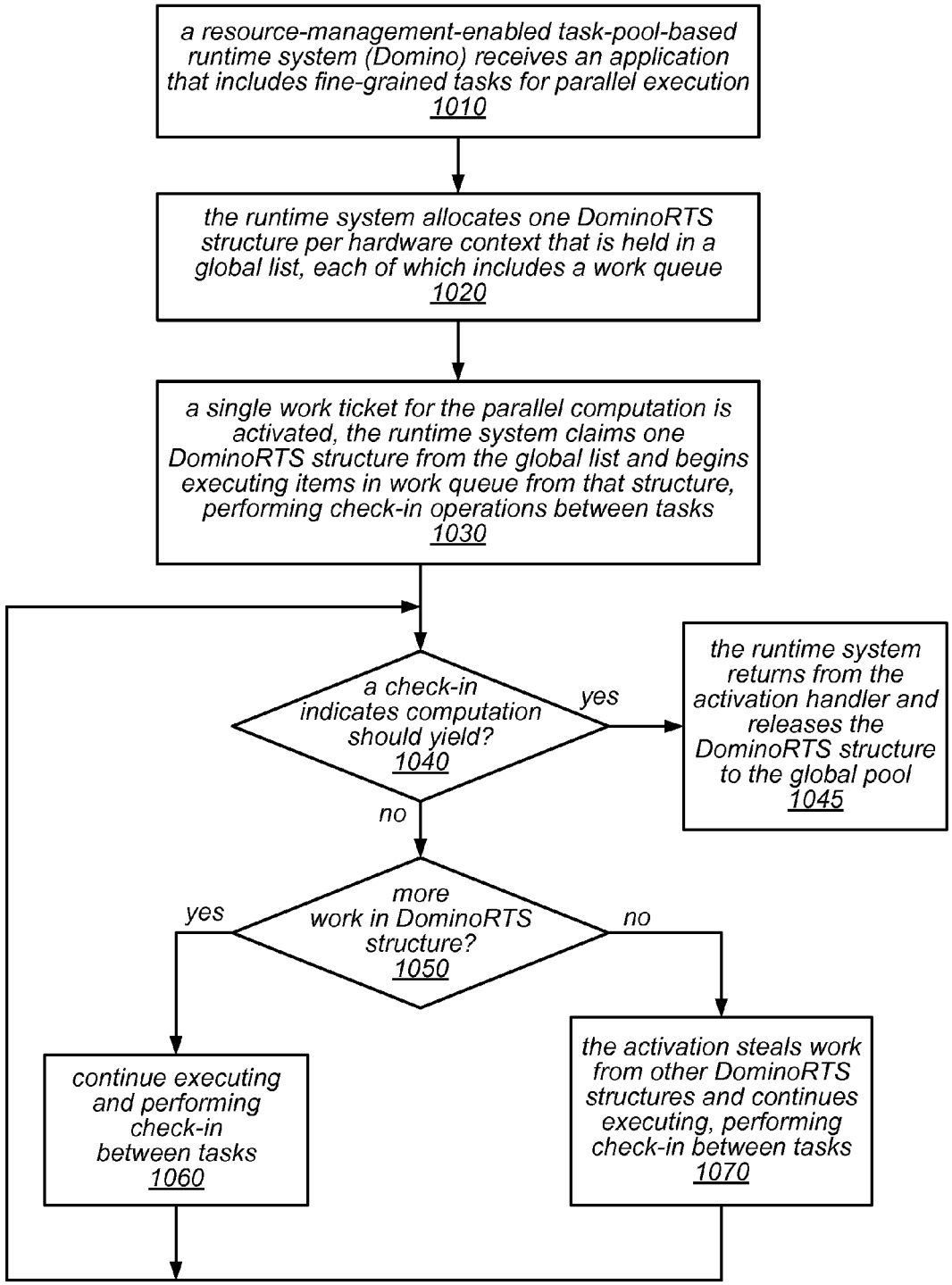
FIG. 10 is a flow diagram illustrating one embodiment of a method for using a resource-management-enabled version of a task-pool-based runtime system.

One embodiment of the use of a resource-management-enabled version of a task-pool-based runtime system (e.g., Domino) is illustrated by the flow diagram in FIG. 10. As illustrated at 1010, in this example, the method may include a resource-management-enabled task-pool-based runtime system (Domino) receiving an application that includes fine-grained tasks for parallel execution. The method may include the runtime system allocating one DominoRTS structure per hardware context, where each DominoRTS structure is held in a global list, and each DominoRTS structure includes a work queue (as in 1020). As illustrated in this example, the method may also include activating a single work ticket for the parallel computation, and the runtime system claiming one DominoRTS structure from the global list and beginning to execute items in work queue from that structure, performing check-in operations between tasks (as in 1030). Note that in some embodiments, if tasks are very short-running, check-ins may be performed between batches of tasks rather than after each individual task. In some embodiments, one of the workers executing tasks may be a "main" worker that executes on a hardware context on which the application has high priority. Note that each task that is executed may spawn other tasks. Note also that the runtime system may activate other workers that begin executing tasks in the work queues of other DominoRTS structures on their respective hardware contexts (and that also perform check-in operations between tasks), and that those workers can also steal work from other work queues.

If the result of a check-in operation indicates that the parallel computation should yield (shown as the positive exit from 1040), the method may include the runtime system returning from the activation handler and releasing the DominoRTS structure to the global pool, as in 1045. On the other hand, if the result of a check-in operation does not indicate that the parallel computation should yield (shown as the negative exit from 1040), the method may include continuing execution of the parallel computation on the hardware contexts currently allocated to the computation.

As illustrated in FIG. 10, as long as there is more work in the claimed DominoRTS structure (shown as the positive exit from 1050), the method may include continuing to execute items in the work queue of the DominoRTS structure and perform check-in between tasks. This is illustrated in FIG. 10 as element 1060 and the feedback from 1060 to 1040. However, if the computation runs out of work in the work queue of the DominoRTS structure (shown as the negative exit from 1050), the method may include the activation stealing work from one or more other DominoRTS structures, continuing execution of the computation (e.g., executing the stolen work items), and performing check-in between tasks until a check-in indicates that the computation should yield or until the computation is complete and yields its hardware context(s) (not shown). This is illustrated in FIG. 10 as element 1070 and the feedback from 1070 to 1040.

In some embodiments, applying the approach described above may result in a design in which a Domino job is responsive to the demands of other parallel jobs executing on the same machine, but the Domino job itself will never actually block, even if it is short of work. While this may not be ideal from a system-wide point of view, it may provide an example of an aggressive (high performing) parallel runtime system.

At least some of the techniques described herein for implementing dynamic co-scheduling of hardware contexts for parallel runtime systems have been evaluated by building prototype systems and comparing them against existing systems. For example, various experiments have been performed using two-socket machines that include eight processor cores per socket, and two hardware contexts per core, for a total of 32 hardware contexts. Three sets of workloads were evaluated on these machines, including a Domino implementation of betweenness-centrality (BC); graph analytic workloads from publically available benchmarks (including a separate implementation of BC, a single-source shortest paths algorithm, a page ranking algorithm, and a triangle counting algorithm, all of which were compiled to OpenMP); and other benchmarks for OpenMP. In these experiments, the input parameters were set so that each run is 10-100 s in isolation on a whole machine.

In the first set of experiments, various jobs were run alone in order to determine how well they perform without the dynamic co-scheduling techniques described herein and the additional infrastructure for implementing those techniques, and in order to be able compare these results with their performance on resource-management-enabled versions of the runtime systems. For consistency, all results were normalizes to runs in which a job uses 16 software threads, bound to all 16 hardware contexts in a single socket.

The single-job behavior of these benchmarks was found to be dependent on the number of threads used, and on the thread placement policy. However, some general observations can be made based on the results. For example, active synchronization usually behaved well when avoiding hyper-threading, while passive synchronization tended to behave better when using hyper-threading. Based on these results, other experiments were focused on the use of passive synchronization, as there was generally little or no gain achieved by using active synchronization, particularly when the machine was fully loaded.

A second set of experiments varied the number of software threads while using the original runtime systems and using the resource management components described herein and resource-management-enabled versions of those runtime systems. Overall, it was found that over-subscription did not work well with the original systems. For example, with over-subscription, OpenMP threads were frequently preempted while holding these spinlocks.

When using the resource management components and resource-management-enabled runtime systems described herein, load imbalances observed in some benchmarks without these modifications were reduced, but the performance of other benchmarks were harmed by adding sequential work. Some benchmarks are not harmed by over-subscription. Instead, the additional runtime system threads were multiplexed over the workers allocated to the job, and switches between OpenMP threads occurred only when the previous runtime system thread blocked or yielded. Consequently, runtime system threads were not preempted while holding the unique reference to a piece of work, or spinlocks.

In experiments with pairs of jobs, several approaches were compared: (i) statically partitioning the machine, giving one socket to each job, (ii) running each job with the original runtime systems and 32 unbound software threads using passive synchronization where available, and (iii) running each job with the resource management components and resource-management-enabled runtime systems described herein and over-subscription to 64 software threads. Each job was repeated in a loop, continuing until both benchmarks ran at least five times. Hence, if a short benchmark ran alongside a longer one, the load of two jobs remained until both were complete. The configuration of 32 un-bound software threads was chosen because this gave the best results of the alternatives that were tested (specifically, the tests used bound threads but passive synchronization, bound/unbound configurations with each job given exclusive access to one hardware context for its main thread, and unbound configurations with over-subscription).

The per-job results revealed cases in which one job in a pair was being harmed by the other. Unlike the pairwise results, this was not symmetric. In other words, some jobs were particularly aggressive, while other jobs were particularly sensitive. When hardware contexts for the two sockets were statically partitioned between the two jobs, there was not much interference, but there were also few (or no) gains. Without the resource management components and resource-management-enabled runtime systems described herein, the gain results showed that jobs often benefit from sharing the two sockets. For example, some jobs have an IO-bound loading phase during which a concurrent job can use more of the hardware contexts. The waste results were poor in some pairs. For example, Domino threads were preempted when they hold unique references to deferred tasks. Other per-job results revealed particularly aggressive preemption, resulting in over a 2× slowdown for many other jobs (and a worst-case slowdown of 3.50×).

The results with the resource management components and resource-management-enabled runtime systems described herein showed that there was much less interference, and that when interference did occur it was much less severe. However, using the techniques described herein to avoid interference did not mean that there were no opportunities for gains. The per-job results illustrated that the techniques described herein remove most of the interference. Intuitively, systems that employ the techniques described herein retain the gains when bursty jobs run together, while drastically reducing interference between them. This was quantified by plotting the cumulative distribution functions (CDFs) for the pairwise and per-job results (not shown).

Experiments using a synthetic workload showed similar performance gains, and also illustrated some sensitivity to different parameters. For example, by default the hysteresis parameters $H_{high}$ and $H_{low}$ were set to 10 ms. Increasing the hysteresis time pushed the results when using the resource management components and resource-management-enabled runtime systems described herein closer to static partitioning (e.g., by allowing a job to retain hardware contexts it is not using). For example, increasing these values to 1s meant that only very coarse gains were possible, due almost entirely to IO-bound loading phases. Reducing these values below 1 ms led some benchmarks to become more aggressive to other jobs (e.g., the other job would more frequently yield a context, and need to wait to get it back).

The default low-priority check in interval $P_{low}$ was 1 ms and in $P_{high}$ was 100 ms. The benchmarks did not appear to be very sensitive to these settings. For example, the check-in operations (which do little more than examine a table in shared-memory) are relatively inexpensive to perform. Instead, performance appeared to be more dependent on letting jobs retain a hardware context during short gaps in their own execution, rather than on letting them regain a hardware context quickly upon unblocking. Similarly, the runaway timer period was set to match the value of $P_{low}$. While it was felt that this timer was important, it ultimately had little effect on the results. For example, the jobs checked in sufficiently often that only occasional long batches of loop iterations were caught by the runaway timer.

As described in detail herein, there appears to be an increasing impetus for making good utilization of hardware in order to save energy (e.g., by avoiding leaving resources idle), to improve performance (e.g., by allowing jobs to use resources that would otherwise sit idle), or to reduce costs (e.g., by allowing more jobs to be packed onto a smaller set of multi-core machines). The techniques described herein for implementing dynamic co-scheduling of hardware contexts for parallel runtime systems may significantly improve the performance of sets of jobs running together on a shared machine at high utilization.

While described in terms of particular operating systems and runtime systems, these techniques may be more generally applicable to any systems that are responsible for sharing resources between multiple competing parallel workloads, in different embodiments. For example, they have be applicable to both operating systems and virtual machine monitors.

Example System

Figure 11:
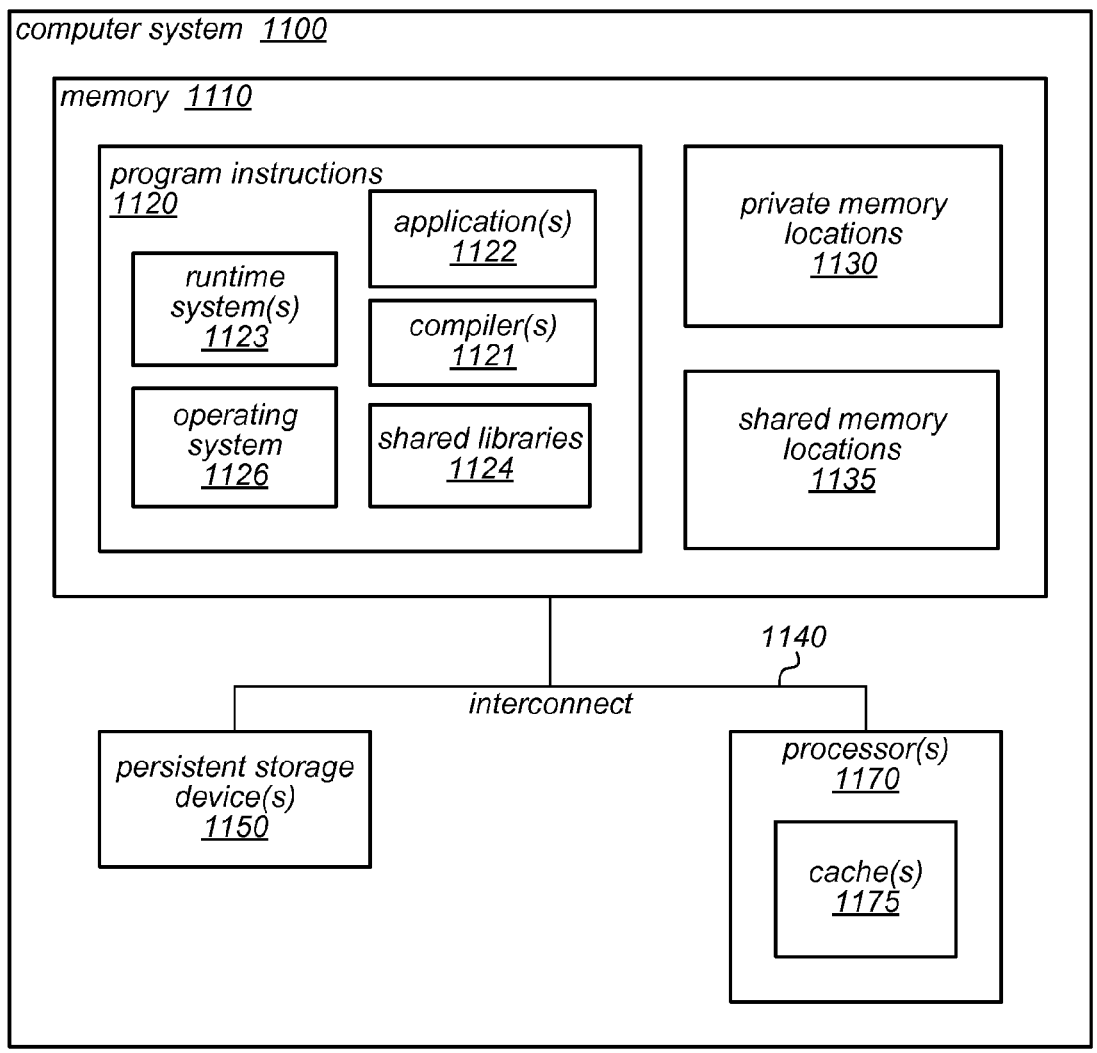
FIG. 11 illustrates a computing system configured to implement dynamic co-scheduling of hardware contexts for parallel runtime systems, according to various embodiments.

FIG. 11 illustrates a computing system configured to implement the methods described herein, according to various embodiments. The computer system 1100 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing dynamic co-scheduling of hardware contexts for parallel runtime systems, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1100 may include one or more processors 1170; each may include multiple cores, any of which may be single or multi-threaded. For example, as illustrated in FIG. 1, multiple processor cores may be included in a single processor chip (e.g., a single processor 1170 or processor chip 110), and multiple processor chips may be included on a CPU board, two or more of which may be included in computer system 1100. Each of the processors 1170 may include a hierarchy of caches, in various embodiments. For example, as illustrated in FIG. 1, each processor chip 110 may include multiple L1 caches (e.g., one per processor core) and one or more other caches (which may be shared by the processor cores on the processor chip). The computer system 1100 may also include one or more persistent storage devices 1150 (e.g. optical storage, magnetic storage, hard drive, tape drive, solid state memory, etc) and one or more system memories 1110 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 11 (e.g., video cards, audio cards, additional network interfaces, peripheral devices, a network interface such as an ATM interface, an Ethernet interface, a Frame Relay interface, etc.)

The one or more processors 1170, the storage device(s) 1150, and the system memory 1110 may be coupled to the system interconnect 1140. One or more of the system memories 1110 may contain program instructions 1120. Program instructions 1120 may be executable to implement one or more compilers 1121, one or more applications 1122 (which may include parallel computations suitable for execution on multiple hardware contexts, as described herein), one or more runtime systems 1123 (which may include resource-management-enabled runtime systems), shared libraries 1124, and/or operating systems 1126. In some embodiment, program instructions 1120 may be executable to implement a contention manager (not shown). Program instructions 1120 may be encoded in platform native binary, any interpreted language such as Java™ byte-code, or in any other language such as C/C++, Java™, etc or in any combination thereof. The program instructions 1120 may include functions, operations and/or other processes for implementing dynamic co-scheduling of hardware contexts for parallel runtime systems, as described herein. Such support and functions may exist in one or more of the shared libraries 1124, operating systems 1126, or applications 1122, in various embodiments. For example, in some embodiments, the resource management components described herein may be implemented as user-mode shared libraries that link with resource-management-enabled versions of different parallel runtime systems to perform dynamic co-scheduling of hardware contexts for those parallel runtime systems. The system memory 1110 may further comprise private memory locations 1130 and/or shared memory locations 1135 where data may be stored. For example, shared memory locations 1135 may store a table in which resource demands and allocations are recorded on a per-hardware-context basis and/or other data accessible to concurrently executing threads, processes, or transactions, in various embodiments. In addition, the system memory 1110 and/or any of the caches of processor(s) 1170 may, at various times, store delay parameter values, hysteresis parameter values, periodic check-in parameter values, spinning limit values, lists or queues of work items or work tickets, values of condition variables or synchronization variables, lists or queues of predicates, latch structures, state information for latches, state information for jobs, work items or work tickets, priority information for jobs and/or hardware contexts, identifiers of jobs, software threads and/or hardware contexts, various counters or flags, threshold values, policy parameter values, maximum count values, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of runtime systems, resource management components, structures, and scheduling policies, it should be noted that the techniques and mechanisms disclosed herein for implementing dynamic co-scheduling of hardware contexts for parallel runtime systems may be applicable in other contexts in which the types of runtime systems, resource management components, structures, and scheduling policies are different than those described in the examples herein. It is intended that the following claims be interpreted to embrace all such variations and modifications.

What is claimed:

1. A method, comprising:
    performing by a computer:
        receiving two or more applications configured for parallel execution on the computer, each application implementing multiple software threads for performing work on behalf of the respective application;
        for each of the two or more applications, associating each of the application's multiple software threads with a respective one of multiple hardware contexts in the computer, wherein a single software thread of each of the two or more applications is associated with each of the multiple hardware contexts, and wherein the software threads of the two or more applications remain associated with their respective hardware contexts during execution of the two or more applications;
        for each of the two or more applications:
            determining one or more of the multiple hardware contexts to allocate to the application, dependent on collective resource demands of the two or more applications, wherein each of the multiple hardware contexts is allocated to only one of the two or more applications; and
            allocating the one or more determined hardware contexts to the software threads of the application that are associated with the one or more determined hardware contexts, wherein each hardware context is allocated to a single software thread of one of the two or more applications;
        the software threads of the two or more applications to which hardware contexts are allocated beginning to perform work on behalf of the two or more applications on the hardware contexts; and
        prior to completing execution of the two or more applications, and in response to detecting a change in the collective resource demands of the two or more applications, re-allocating at least one of the hardware contexts to another software thread that is associated with the hardware context, wherein the other software thread is a software thread of an application other than the application to which the hardware context is allocated, and wherein the software thread of the application to which the hardware context is allocated remains associated with the hardware context while the other software thread is executing on the hardware context.

2. The method of claim 1, wherein said associating, said determining, said allocating, and said re-allocating are performed by one or more resource-management-enabled parallel runtime systems executing on the computer.

3. The method of claim 2, wherein the method further comprises, prior to said receiving the two or more applications:
    building one or more resource management component instances over an operating system executing on the computer without modifying the operating system; and
    modifying one or more parallel runtime systems for use with respective ones of the one or more resource management component instances to produce the one or more resource-management-enabled parallel runtime systems;
    wherein said receiving the two or more applications configured for parallel execution on the computer comprises receiving one or more applications that are configured for execution over the one or more parallel runtime systems prior to said modifying; and
    wherein said associating, said determining, said allocating, and said re-allocating are performed by the one or more resource-management-enabled parallel runtime systems executing on the computer without modifying the one or more applications.

4. The method of claim 2, wherein the method further comprises, prior to said receiving the two or more applications:
    creating one or more resource management component instances;
    integrating the one or more resource management component instances into a kernel of an operating system executing on the computer; and
    modifying one or more parallel runtime systems for use with respective ones of the one or more resource management component instances to produce the one or more resource-management-enabled parallel runtime systems;
    wherein said receiving the two or more applications configured for parallel execution on the computer comprises receiving one or more applications that are configured for execution over the one or more parallel runtime systems prior to said modifying; and
    wherein said associating, said determining, said allocating, and said re-allocating are performed by the one or more resource-management-enabled parallel runtime systems executing on the computer without modifying the one or more applications.

5. The method of claim 1,
    wherein the method further comprises, for each of the two or more applications, in response to said allocating the one or more determined hardware contexts to the software threads of the application that are associated with the one or more determined hardware contexts, a resource management component instance recording information indicating the allocation of the one or more determined hardware contexts to the software threads of the application that are associated with the one or more determined hardware contexts in a co-ordination table that stores information about resource demands and allocations for each of the multiple hardware contexts in the computer;

wherein said allocating and said re-allocating are dependent on information stored in the co-ordination table.

6. The method of claim 1, wherein for each of the two or more applications, said associating each of the application's multiple software threads with a respective one of multiple hardware contexts in the computer comprises designating the application as having high priority on one or more of the multiple hardware contexts, wherein only one of the two or more applications is designated as having high priority on a given hardware context.

7. The method of claim 6,
wherein the method further comprises, prior to said re-allocating, one of the software threads of the two or more applications that are associated with the determined hardware contexts performing a check-in operation to determine whether there has been a change in the collective resource demands of the two or more applications; and
wherein said detecting a change in the collective resource demands of the two or more applications is dependent on said performing a check-in operation.

8. The method of claim 7, wherein said performing a check-in operation comprises one or more of: determining whether an application has run out of work, determining whether a software thread is no longer performing work on a hardware context that was previously allocated to it, determining whether a software thread has begun performing work on a hardware context that was previously allocated to it, or determining whether an application designated as having high priority for a given hardware context has become runnable.

9. The method of claim 6, wherein said re-allocating comprises an application yielding one or more hardware contexts on which it does not have high priority while retaining one or more hardware contexts on which the application is designated as having high priority.

10. The method of claim 6, wherein said re-allocating comprises one of the software threads for the two or more applications that are associated with the determined hardware contexts yielding a given hardware context to a software thread of an application designated as having high priority on the given hardware context.

11. The method of claim 1, wherein said re-allocating comprises re-allocating a hardware context from an associated software thread of an application that has since run out of work to an associated software thread of an application that has not yet run out of work.

12. The method of claim 1,
wherein the method further comprises, for each application, prior to said associating, creating one or more work tickets for the application, each of which represents a source of parallelism in the application; and
wherein said beginning to perform work comprises each of the software threads placing an up-call to a resource-management-enabled parallel runtime system to execute a portion of one of the one or more work tickets for the application.

13. The method of claim 1, wherein said determining one or more of the multiple hardware contexts to allocate to the application and said re-allocating are dependent on a spatial scheduling policy that designates, for each hardware context, a single application as having high priority for the hardware context, or on a temporal scheduling policy that specifies how a hardware context is to be allocated when a single application designated as having high priority for the hardware context is idle.

14. A system, comprising:
a plurality of processor cores, each of which includes one or more hardware contexts;
a memory comprising program instructions that when executed on the plurality of processor cores cause the plurality of processor cores to implement:
two or more resource management component instances;
two or more resource-management-enabled parallel runtime systems; and
a co-ordination table that is accessible by the two or more resource management component instances and that stores information about resource demands for and allocations of each of the hardware contexts in each of the plurality of processor cores;
wherein each of the two or more resource-management-enabled parallel runtime systems is configured to:
receive two or more applications configured for parallel execution on the plurality of processor cores; and
for each of the two or more applications:
create a respective software thread for the application for each of the hardware contexts in each of the plurality of processor cores;
associate the respective software thread for the application with each of the hardware contexts in each of the plurality of processor cores, wherein a single software thread of each of the two or more applications is associated with each of the multiple hardware contexts, and wherein the software threads of the two or more applications remain associated with their respective hardware contexts during execution of the two or more applications;
determine one or more of the hardware contexts to allocate to the application, dependent on collective resource demands of the two or more applications, wherein each of the multiple hardware contexts is allocated to only one of the two or more applications; and
allocate the one or more determined hardware contexts to the software threads of the application that are associated with the one or more determined hardware contexts, wherein each hardware context is allocated to a single software thread of one of the two or more applications;
wherein each of the two or more resource management component instances is configured to:
record information indicating the allocation of the determined hardware contexts to the associated threads for the application in the co-ordination table; and
receive up-calls from the software threads for the two or more applications to which hardware contexts are allocated to begin performing work on behalf of the two or more applications on the hardware contexts; and
wherein one of the two or more resource-management-enabled parallel runtime systems is further configured to:

re-allocate at least one of the hardware contexts to another software thread that is associated with the hardware context, wherein the other software thread is a software thread of an application other than the application to which the hardware context is allocated dependent, at least in part, on the information stored in the co-ordination table, and wherein the software thread of the application to which the hardware context is allocated remains associated with the hardware context while the other software thread is executing on the hardware context.

15. The system of claim 14,
wherein the software threads of the two or more applications that are associated with the determined hardware contexts are configured to perform periodic check-in operations, and wherein the check-in operations are configured to determine whether an application has run out of work, determine whether a software thread is no longer performing work on a hardware context that was previously allocated to it, determine whether a software thread has begun performing work on a hardware context that was previously allocated to it, or determine whether an application designated as having high priority for a given hardware context has become runnable; and
wherein re-allocating the at least one of the determined hardware contexts to another software thread of an application other than the application to which the hardware is further dependent on a result of a periodic check-in operation.

16. The system of claim 14, wherein to re-allocate at least one of the hardware contexts, the one of the two or more resource-management-enabled parallel runtime systems is configured to request that an application yield one or more hardware contexts on which it does not have high priority while retaining one or more hardware contexts on which the application is designated as having high priority, to re-allocate a given hardware context to a software thread of an application designated as having high priority on the given hardware context, or to re-allocate a hardware context from an associated software thread of an application that has since run out of work to an associated software thread of an application that has not yet run out of work.

17. A non-transitory, computer-readable storage medium storing program instructions that when executed on a multi-core computer cause the multi-core computer to perform:
receiving two or more applications configured for parallel execution on the multi-core computer, each application implementing multiple software threads for performing work on behalf of the respective application;
for each of the two or more applications, associating each of the application's multiple software threads with a respective one of multiple hardware contexts in the multi-core computer, wherein a single software thread of each of the two or more applications is associated with each of the multiple hardware contexts, and wherein the software threads of the two or more applications remain associated with their respective hardware contexts during execution of the two or more applications;
for each of the two or more applications:
determining one or more of the multiple hardware contexts to allocate to the application, dependent on collective resource demands of the two or more applications, wherein each of the multiple hardware contexts is allocated to only one of the two or more applications; and
allocating the one or more determined hardware contexts to the software threads of the application that are associated with the one or more determined hardware contexts, wherein each hardware context is allocated to a single software thread of one of the two or more applications;
the software threads of the two or more applications to which hardware contexts are allocated beginning to perform work on behalf of the two or more applications on the hardware contexts; and
prior to completing execution of the two or more applications, and in response to detecting a change in the collective resource demands of the two or more applications, re-allocating at least one of the hardware contexts to another software thread that is associated with the hardware context, wherein the other software thread is a software thread of an application other than the application to which the hardware context is allocated, and wherein the software thread of the application to which the hardware context is allocated remains associated with the hardware context while the other software thread is executing on the hardware context.

18. The non-transitory, computer-readable storage medium of claim 17,
wherein when executed on the multi-core computer, the program instructions further cause the multi-core computer to implement:
two or more resource management component instances; and
two or more resource-management-enabled parallel runtime systems, each of which is built over a respective one of the two or more resource management component instances;
wherein when executed on the multi-core computer, the program instructions further cause the multi-core computer to implement a co-ordination table that is accessible by the two or more resource management component instances and that stores information about resource demands and allocations for each of multiple hardware contexts in each of a plurality of cores in the multi-core computer;
wherein when executed on the multi-core computer, the program instructions further cause the multi-core computer to perform, in response to said allocating, a resource management component instance recording an indication of the allocation of the determined hardware contexts to the software threads of the applications that are associated with the hardware contexts in a co-ordination table that stores information about resource demands and allocations for each of the multiple hardware contexts in each of the plurality of cores in the multi-core computer; and
wherein said allocating and said re-allocating are dependent on information stored in the co-ordination table.

19. The non-transitory, computer-readable storage medium of claim 18, wherein when executed on the multi-core computer, the program instructions further cause the multi-core computer to implement an application programming interface that is common to the two or more applications, the two or more resource management component instances, and the two or more resource-management-enabled parallel runtime systems, and that comprises one or more synchronization operations usable in managing the dynamic allocation of hardware contexts in the multi-core computer.

20. The non-transitory, computer-readable storage medium of claim 19, wherein at least one of the one or more synchronization operations employs a predicate over one or more synchronization variables that are protected by a particular latch to describe a condition on which to wait.

* * * * *

UNITED STATES PATENT AND TRADEMARK OFFICE
CERTIFICATE OF CORRECTION

PATENT NO.         : 9,542,221 B2
APPLICATION NO.    : 14/285513
DATED              : January 10, 2017
INVENTOR(S)        : Harris et al.

Page 1 of 1

It is certified that error appears in the above-identified patent and that said Letters Patent is hereby corrected as shown below:

In Column 14, Line 42, delete "C4." and insert -- C4, --, therefor.

In Column 18, Line 40, delete "may be be" and insert -- may be --, therefor.

In Column 19, Line 41, after "work" insert -- . --.

In Column 33, Line 10, delete "Is" and insert -- 1s --, therefor.

In Column 33, Line 45, delete "be" and insert -- been --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*